(12) United States Patent
Honda

(10) Patent No.: US 8,367,240 B2
(45) Date of Patent: Feb. 5, 2013

(54) LITHIUM SECONDARY BATTERY WITH WOUND ELECTRODES

(75) Inventor: Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 952 days.

(21) Appl. No.: 12/064,672

(22) PCT Filed: Oct. 16, 2006

(86) PCT No.: PCT/JP2006/320543
§ 371 (c)(1),
(2), (4) Date: Feb. 25, 2008

(87) PCT Pub. No.: WO2007/046322
PCT Pub. Date: Apr. 26, 2007

(65) Prior Publication Data
US 2009/0162746 A1 Jun. 25, 2009

(30) Foreign Application Priority Data

Oct. 21, 2005 (JP) ................................ 2005-306903

(51) Int. Cl.
*H01M 2/18* (2006.01)
(52) U.S. Cl. ............... 429/133; 429/231.95; 429/238; 429/152; 429/135
(58) Field of Classification Search .......... 429/245, 429/231.95, 238, 133, 252, 13
See application file for complete search history.

(56) References Cited

U.S. PATENT DOCUMENTS

| | | | | |
|---|---|---|---|---|
| 5,582,935 A * | 12/1996 | Dasgupta et al. | ......... | 429/218.1 |
| 6,365,300 B1 * | 4/2002 | Ota et al. | ...................... | 429/304 |
| 6,605,386 B1 * | 8/2003 | Kasamatsu et al. | ....... | 429/218.1 |
| 7,160,646 B2 * | 1/2007 | Ohshita et al. | ............. | 429/218.1 |
| 7,794,878 B2 * | 9/2010 | Kogetsu et al. | ............ | 429/218.1 |
| 7,816,032 B2 * | 10/2010 | Honda et al. | ............... | 429/218.1 |
| 2005/0100790 A1 * | 5/2005 | Ota et al. | ................. | 429/231.95 |
| 2007/0031733 A1 * | 2/2007 | Kogetsu et al. | ............... | 429/245 |
| 2009/0104528 A1 * | 4/2009 | Takahashi et al. | ............ | 429/223 |

FOREIGN PATENT DOCUMENTS

| | | | |
|---|---|---|---|
| EP | 123165 A1 * | 8/2008 | |
| JP | 2004-127561 | 4/2004 | |
| JP | 2005-196970 | 7/2005 | |
| JP | 2005-209533 | 8/2005 | |
| JP | 2005-243371 | 9/2005 | |
| JP | 2006-155958 | 6/2006 | |
| WO | WO 01/31721 A1 | 5/2001 | |

OTHER PUBLICATIONS

JP2005-196970 mashine translation.*

* cited by examiner

*Primary Examiner* — Patrick Ryan
*Assistant Examiner* — Alex Usyatinsky
(74) *Attorney, Agent, or Firm* — McDermott Will & Emery LLP

(57) ABSTRACT

A battery comprising a first electrode, a second electrode, a separator interposed between the first electrode and the second electrode, and an electrolyte having lithium ion conductivity. The first electrode and the second electrode are wound with the separator interposed therebetween to form an electrode assembly. The first electrode includes a current collector and an active material layer carried on one face of the current collector. The active material layer includes columnar particles having a bottom and a head, the bottom of the columnar particles being adhered to the current collector. The head of the columnar particles is positioned at an outer round side of the electrode assembly than the bottom.

9 Claims, 22 Drawing Sheets

LITHIUM SECONDARY BATTERY WITH WOUND ELECTRODES

RELATED APPLICATIONS

This application is the U.S. National Phase under 35 U.S.C. §371 of International Application No. PCT/JP2006/320543, filed on Oct. 16, 2006, which in turn claims the benefit of Japanese Application No. 2005-306903, filed on Oct. 21, 2005, the disclosures of which Applications are incorporated by reference herein.

TECHNICAL FIELD

The invention relates to batteries, and specifically relates to a battery including an electrode including a current collector and an active material layer carried on the current collector, in which the active material layer includes columnar particles.

BACKGROUND ART

In recent years, as an electrode material for non-aqueous electrolyte secondary batteries, a material containing a high capacity element has been attracting interest. For example, a material containing silicon (Si) or tin (Sn) has been attracting interest as a negative electrode active material with high capacity. The theoretical discharge capacity of Si is approximately 4199 mAh/g, which corresponds to an amount approximately 11 times as large as the theoretical discharge capacity of graphite.

However, these active materials, during the absorption of lithium ions, undergo a great change in their structures and expand. As a result, the active material particles break or the active material is peeled off from the current collector. This results in a reduction in electron conductivity between the active material and the current collector, which may degrade battery characteristics (in particular, cycle characteristics).

Under these circumstances, there has been proposed to use an oxide, a nitride, an oxynitride, etc. containing Si or Sn. In active materials including these, although the discharge capacity is slightly reduced, the degrees of expansion and contraction are reduced. Further, there has been proposed to provide an active material layer with a space for relieving the expansion during the absorption of lithium ions (Patent Documents 1 to 3).

Patent document 1 proposes forming an active material layer including columnar particles in a predetermined pattern on a current collector. A photo resist method and plating techniques are employed in forming a negative electrode active material layer. By forming an active material in a columnar state, gaps are created in the active material layer. This relieves the stress due to the expansion and the contraction of the active material, and prevents the destruction of the active material.

Patent Document 2 discloses an electrode including active material particles slanting with respect to a direction normal to a current collector. By slanting the active material particles with respect to a direction normal to the current collector, the stress due to the expansion and the contraction of the active material is relieved, and the destruction and the peeling-off from the current collector of the active material layer can be suppressed. This results in an improvement in battery characteristics such as cycle characteristics.

Patent Document 3 discloses a method for growing active material particles slanting with respect to a direction normal to a current collector of continuous length. The current collector of continuous length is transferred from a feeding roller to a film-forming roller. An element (an active material source) capable of absorbing and desorbing lithium is emitted from a target so as to be incident on the current collector on the film-forming roller. Between the current collector and the target, a mask for shielding the active material source is disposed so that the active material source cannot be incident on the surface of the current collector from a direction perpendicular thereto.

Patent Document 1: Japanese Laid-Open Patent Publication No. 2004-127561
Patent Document 2: Japanese Laid-Open Patent Publication No. 2006-155958
Patent Document 3: Japanese Laid-Open Patent Publication No. 2005-196970

DISCLOSURE OF THE INVENTION

Problem to Be Solved by the Invention

In the negative electrode as disclosed in Patent Document 1, the active material particles (columnar particles) are allowed to stand upright in a direction normal to the current collector. Therefore, during the expansion of the active material, the electrode is subjected to intensive pressure from the upper and lower directions. For example, from an adjacent separator to the electrode, intensive pressure in the direction normal to the current collector is applied. Moreover, since individual columnar particles are separated by the gaps present among the particles, the mechanical strength of the columnar particles is not necessarily high. For this reason, the pressure from the upper and lower directions deforms the micropores of the separator or destroys the active material particles. As a result, the cycle characteristics or rate characteristics of the battery are degraded.

The electrodes as disclosed in Patent Documents 2 and 3 are effective in relieving the stress due to the expansion and the contraction of an active material, and produce a certain level of effect in improving battery characteristics. However, it is expected to improve the battery characteristics through further stress relieving.

The invention intends to provide a highly reliable battery having excellent characteristics by effectively relieving the stress due to the expansion and the contraction of a high capacity active material.

Means for Solving the Problem

The invention relates to a battery including a first electrode, a second electrode, a separator interposed between the first electrode and the second electrode, and an electrolyte having lithium ion conductivity, the first electrode and the second electrode being wound with the separator interposed therebetween to form an electrode assembly, wherein the first electrode includes a current collector and an active material layer carried on one face of the current collector; and the active material layer includes columnar particles having a bottom and a head, the bottom of the columnar particles being adhered to the current collector, and the head of the columnar particles being positioned at an outer round side of the electrode assembly than the bottom.

In this battery, a preferred angle formed between a direction from the bottom toward the head of the columnar particles (a growth direction of the columnar particles) and a direction normal to the current collector is 20° to 70°.

A preferred angle formed between a component parallel to the current collector of the direction from the bottom toward the head of the columnar particles and a winding axis of the electrode assembly is 80° or more and 100° or less.

It is preferable that the columnar particles are curved such that a current collector side thereof is projected.

It is preferable that the columnar particles include at least one selected from the group consisting of a silicon simple substance, a silicon alloy, a compound containing silicon and oxygen, a compound containing silicon and nitrogen, a tin simple substance, a tin alloy, a compound containing tin and oxygen, and a compound containing tin and nitrogen.

The invention also relates to a battery including a first electrode, a second electrode, a separator interposed between the first electrode and the second electrode, and an electrolyte having lithium ion conductivity, the first electrode and the second electrode being wound with the separator interposed therebetween to form an electrode assembly, wherein the first electrode includes a current collector, a first active material layer carried on one face of the current collector, and a second active material layer carried on the other face of the current collector; the first active material layer includes columnar particles A having a bottom and a head, the bottom of the columnar particles A being adhered to the current collector; the second active material layer includes columnar particles B having a bottom and a head, the bottom of the columnar particles B being adhered to the current collector; the head of the columnar particles A is positioned at an outer round side of the electrode assembly than the bottom; and the head of the columnar particles B is positioned at the outer round side of the electrode assembly than the bottom.

In this battery, a preferred angle formed between a component parallel to the current collector of a direction from the bottom toward the head of the columnar particles A (a growth direction of the columnar particles A), and a component parallel to the current collector of a direction from the bottom toward the head of the columnar particles B (a growth direction of the columnar particles B) is 0° or more and 90° or less.

A preferred angle formed between the direction from the bottom toward the head of the columnar particles A and a direction normal to the current collector is 20° to 70°, and an preferred angle formed between the direction from the bottom toward the head of the columnar particles B and the direction normal to the current collector is also 20° to 70°.

A preferred angle formed between the component parallel to the current collector of the direction from the bottom toward the head of the columnar particles A, and a winding axis of the electrode assembly is 80° or more and 100° or less; and a preferred angle formed between the component parallel to the current collector of the direction from the bottom toward the head of the columnar particles B, and the winding axis of the electrode assembly is also 80° or more and 100° or less.

It is preferable that the columnar particles A are curved such that a current collector side thereof is projected, and the columnar particles B are also curved such that a current collector side thereof is projected.

It is preferable that the columnar particles A and the columnar particles B each include at least one selected from the group consisting of a silicon simple substance, a silicon alloy, a compound containing silicon and oxygen, a compound containing silicon and nitrogen, a tin simple substance, a tin alloy, a compound containing tin and oxygen, and a compound containing tin and nitrogen.

Although the invention is effective especially when the first electrode is a negative electrode, the invention includes a case where the first electrode is a positive electrode. Moreover, the invention includes a case where the second electrode has a structure similar to that of the first electrode as described above.

In the invention, a direction normal to the current collector means a direction being perpendicular to the surface of the current collector as well as departing from the surface of the current collector. Microscopically, the surface of a current collector is rough in many cases, but visually, it is flat. For this reason, a direction normal to the current collector is uniquely determined.

In the invention, unless otherwise defined specifically, a direction from the bottom toward the head of columnar particles is regarded as identical with a growth direction of the columnar particles.

An angle $\beta$ formed between a direction from the bottom toward the head of columnar particles and a direction normal to the current collector can be determined, for example, using an electron microscope (SEM etc). In the case of using an electron microscope, an active material layer is cut in parallel with a direction normal to the current collector as well as in parallel with a growth direction of the columnar particles, and a cross section thereof (hereinafter referred to as a cross section C) is observed.

In the cross section C, mean lines corresponding to the surface of the current collector and the surface of the active material layer are determined. A straight line L which is at equal distance from the determined two mean lines is obtained. The straight line L intersects with a curve representing the contour of a columnar particle at two points. At each of the two points, a tangent to the contour of the columnar particle is determined. Angles $\beta 1$ and $\beta 2$ formed between these tangents and the direction normal to the current collector are determined. Then, the angle $\beta$ formed between the direction from the bottom toward the head of the columnar particles and the direction normal to the current collector can be determined from $\beta=(\beta 1+\beta 2)/2$. Here, a mean line is a term used in JIS Standards (JIS B 0601-1994), which defines surface roughness Ra, meaning a straight line determined from a mean value on a roughness chart.

Even in the case where the growth direction of columnar particles fluctuates as going from the bottom toward the head, a component parallel to the current collector of the growth direction of the columnar particles is uniquely determined depending on production methods. Accordingly, a cross section C is uniquely determined. For example, a flat plane parallel to a vertical direction passing through a center of an active material source to be evaporated and a point on the current collector which is at the shortest distance from the center of the active material source is determined. This flat plane intersects with the current collector to form a straight line, which is in parallel with a component parallel to the current collector of the growth direction of the columnar particles.

Similarly, an angle $\gamma$ formed between a component parallel to the current collector of the direction from the bottom toward the head of columnar particles and a winding axis of the electrode assembly is uniquely determined. Similarly, an angle $\alpha$ formed between a component parallel to the current collector of the direction from the bottom toward the head of columnar particles A and a component parallel to the current collector of the direction from the bottom toward the head of columnar particles B is uniquely determined.

As for the angles $\beta$ and $\gamma$, it is preferable to measure at least 10 columnar particles to determine a mean value thereof. As for the angle $\alpha$ also, it is preferable to measure at least 10 pairs of columnar particles to determine a mean value thereof. It should be noted that the angle $\beta$ tends to become smaller gradually as the charge and discharge of the battery proceeds. Therefore, as for the evaluation of the angle β, it is preferable to use an electrode immediately after production, an electrode included in an unused battery immediately after production, or an electrode included in a battery having been subjected to charge and discharge only 10 times or less.

In the case where the battery of the invention is a lithium secondary battery, one of the first and the second electrodes is a positive electrode capable of absorbing and desorbing lithium ions, and the other is a negative electrode capable of absorbing and desorbing lithium ions. The positive electrode and the negative electrode expand during the absorption of lithium ions and contract during the desorption of lithium ions. However, the expansion and the contraction of the negative electrode are far greater than those of the positive electrode. Therefore, in the invention, an excellent effect can be obtained in a lithium secondary battery in which the negative electrode includes a current collector and an active material layer carried on the current collector, the active material layer includes columnar particles having a bottom and a head, the bottom of the columnar particles is adhered to the current collector, and the head of the columnar particles is positioned at an outer round side of the electrode assembly than the bottom.

EFFECT OF THE INVENTION

The battery of the invention is capable of reducing the pressure to be applied to the separator or the active material layer during the expansion of the active material, and can effectively prevent the occurrence of troubles in the battery. The effect of the invention becomes remarkable particularly when a high capacity active material whose expansion and contraction are evident is used. Reducing the pressure to be applied to the separator or the active material layer during the expansion of the active material makes it possible to maintain the shape (suppress the deformation) of the active material particles (columnar particles) as well as to secure the micropores in the separator. This results in an improvement in rate characteristics and the cycle characteristics of the battery.

BEST MODE FOR CARRYING OUT THE INVENTION

Embodiments of the invention will be hereinafter described with reference to the drawings.

Figure 1:
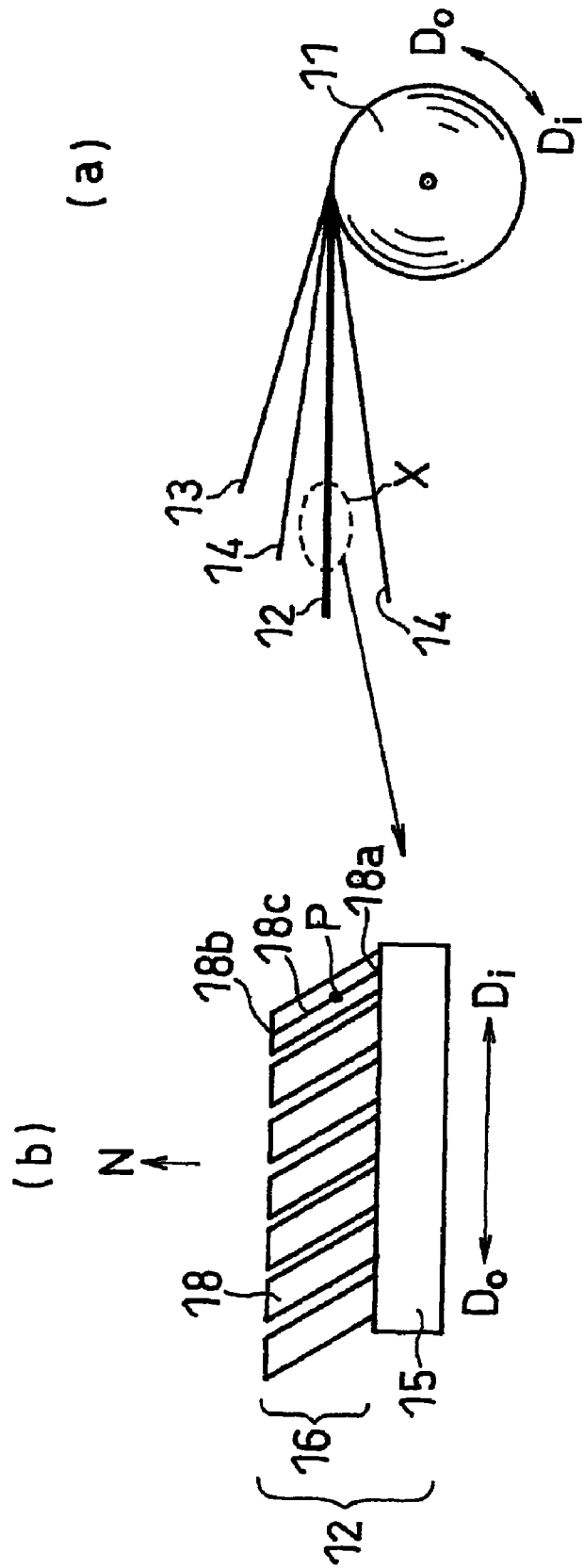
[FIG. 1] A set of schematic structural diagrams of an electrode assembly included in a battery according to an embodiment of the invention.

FIG. 1 is a set of schematic structural diagrams of an electrode assembly included in a battery according to an embodiment of the invention.

FIG. 1(a) is a partially developed diagram viewed from the bottom of one side of a cylindrical electrode assembly 11. As is shown in FIG. 1(a), the electrode assembly 11 includes a band-shaped first electrode 12, a band-shaped second electrode 13, and a band-shaped separator 14 disposed between these electrodes. The first electrode 12 and the second electrode 13 are wound with the separator 14 interposed therebetween. It is preferable that the width of the band-shaped separator 14 is larger than those of the band-shaped first electrode 12 and the band-shaped second electrode 13, in light of securing insulation between the first electrode and the second electrode.

FIG. 1(b) is a magnified schematic diagram of an area encircled by the dashed line X in FIG. 1(a), showing a cross-section of the first electrode 12. The cross-section of the second electrode 13 may be configured similarly to or differently from the first electrode. The first electrode 12 includes a current collector 15 and an active material layer 16 carried on one face of the current collector. The active material layer 16 includes columnar particles 18 having a bottom 18a and a head 18b, and the bottom 18a of the columnar particles 18 is adhered to the current collector 15. The head 18b of the columnar particles 18 is positioned at the outer round side (Do) of the electrode assembly 11 than the bottom 18a.

An axis 18c from the bottom 18a toward the head 18b of the columnar particles 18 is slanted with respect to a direction N normal to the current collector 15. Further, a point P on the axis 18c, as going from the bottom 18a toward the head 18b, moves from the inner round side (Di) to the outer round side (Do) of the electrode assembly 11.

Figure 2:
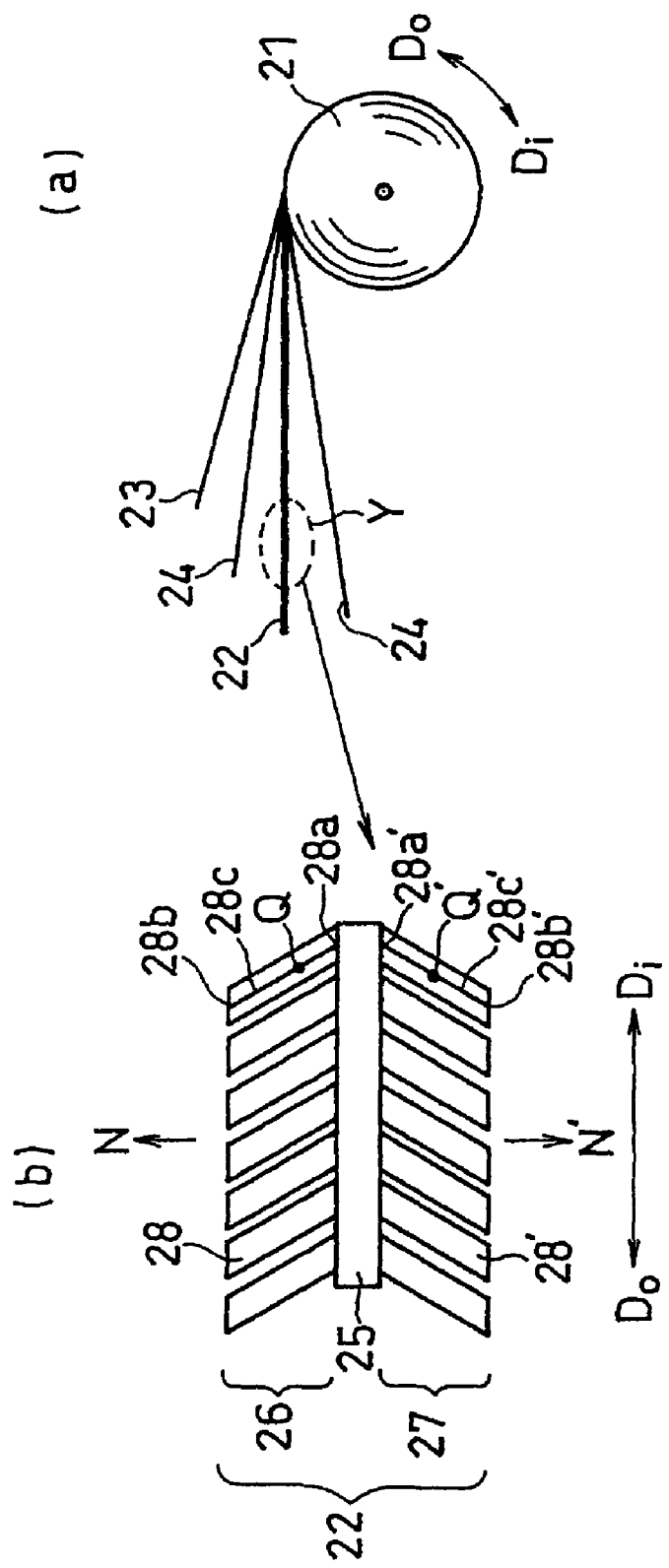
[FIG. 2] A set of schematic structural diagrams of an electrode assembly included in a battery according to another embodiment of the invention.

FIG. 2 is a set of schematic structural diagrams of an electrode assembly included in a battery according to another embodiment of the invention.

FIG. 2(a) is a partially developed diagram viewed from the bottom of one side of a cylindrical electrode assembly 21. As is shown in FIG. 2(a), the electrode assembly 21 includes a band-shaped first electrode 22, a band-shaped second electrode 23, and a band-shaped separator 24 disposed between these electrodes. The first electrode 22 and the second electrode 23 are wound with the separator 24 interposed therebetween. It is preferable that the width of the band-shaped separator 24 is larger than those of the band-shaped first electrode 22 and the band-shaped second electrode 23, in light of securing insulation between the first electrode and the second electrode.

FIG. 2(b) is a magnified schematic diagram of an area encircled by the dashed line Y in FIG. 2(a), showing a cross-section of the first electrode 22. The cross-section of the second electrode 23 may be configured similarly to or differently from the first electrode. The first electrode 22 has a current collector 25 and a first active material layer 26 carried on one face of the current collector and a second active material layer 27 carried on the other face. The first active material layer 26 includes columnar particles A 28 having a bottom 28a and a head 28b, the bottom 28a of the columnar particles 28 being adhered to the current collector 25. Similarly, the second active material layer 27 includes columnar particles B 28' having a bottom 28a' and a head 28b', the bottom 28a' of the columnar particles 28' being adhered to the current collector 25. The head 28b of the columnar particles 28 is positioned at the outer round side (Do) of the electrode assembly 21 than the bottom 28a. The head 28b' of the columnar particles 28' is positioned at the outer round side (Do) of the electrode assembly 21 than the bottom 28a'.

An axis 28c from the bottom 28a toward the head 28b of the columnar particles 28 is slanted with respect to a direction N normal to the current collector 25. Further, a point Q on the axis 28c, as going from the bottom 28a toward the head 28b, moves from the inner round side (Di) to the outer round side (Do) of the electrode assembly 21.

Similarly, an axis 28c' from the bottom 28a' toward the head 28b' of the columnar particles 28' is slanted with respect to a direction N' normal to the current collector 25. Further, a point Q' on the axis 28c', as going from the bottom 28a' toward the head 28b', moves from the inner round side (Di) to the outer round side (Do) of the electrode assembly 21.

It is not necessary that the columnar particles be particles of a strict cylindrical or prismatic shape, but a roughly columnar shape will suffice. Further, the diameter (width) of the columnar particles may be varied in the lengthwise direction thereof. The diameter of the columnar particles may be increased as distanced from the connected portion with the current collector (the bottom). The columnar particles may be curved.

Here, the inner round side of an electrode assembly is a position on the electrode that is closer to a winding axis of the electrode assembly. The winding axis of the electrode assembly is a position from which the winding of a first electrode and a second electrode with a separator interposed therebetween is started, and corresponds to the center of the electrode assembly. The outer round side of an electrode assembly is a position on the electrode that is farther from the winding axis of the electrode assembly (closer to a position at which the winding is completed).

An axis from the bottom toward the head of a columnar particle is synonymous with a center line of the columnar particle in its cross-section. When the columnar particle is of a cylindrical shape, the axis from the bottom toward the head corresponds to the center axis of the cylinder.

Figure 3:
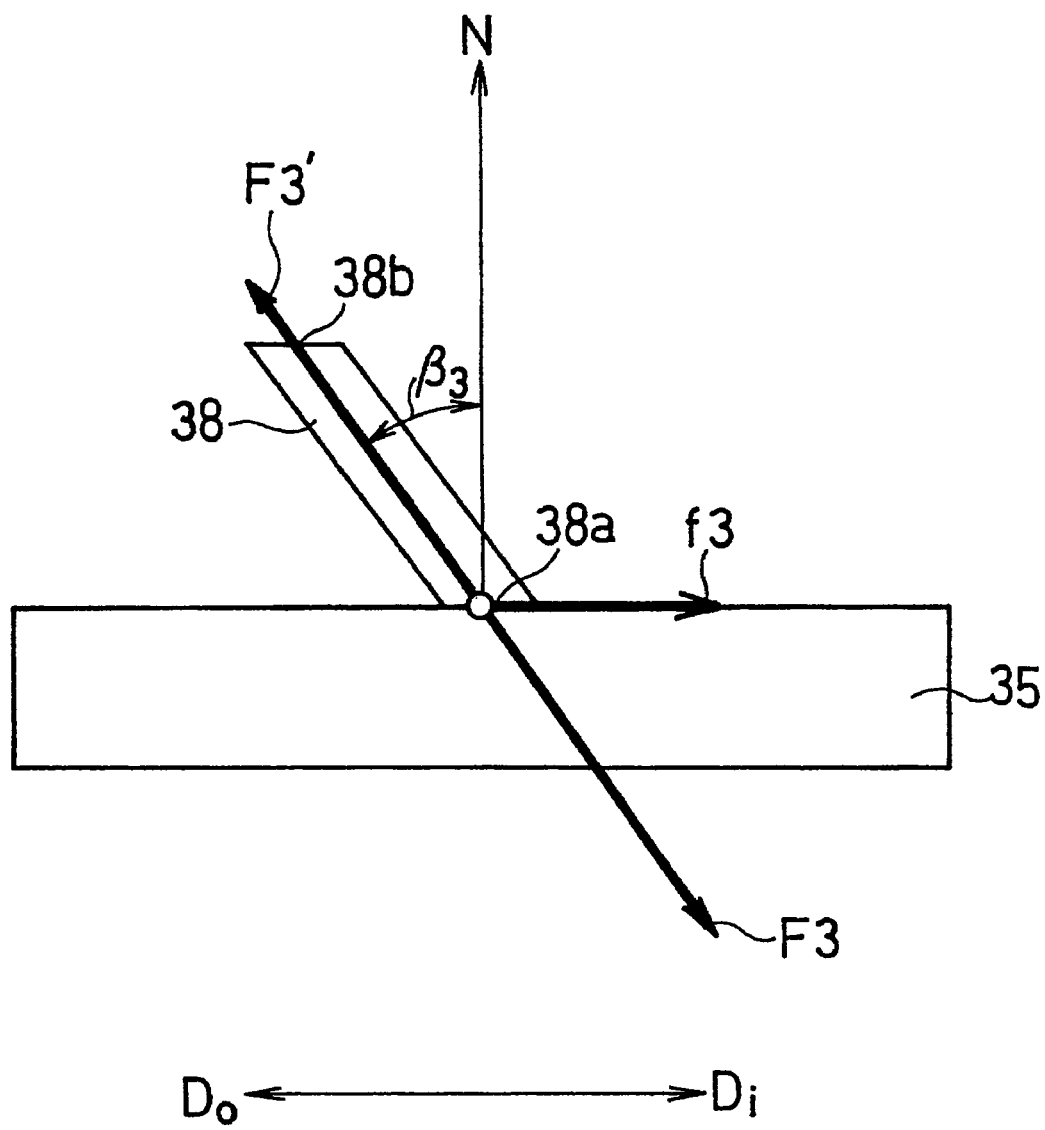
[FIG. 3] A diagram showing dynamic relations between a current collector and columnar particles included in an active material layer.

The effect of the invention will be described with reference to FIG. 3. FIG. 3 shows dynamic relations between a current collector 35 and columnar particles 38 included in an active material layer. In this diagram, only one columnar particle 38 is conceptually shown for convenience. A head 38b of the columnar particle 38 is positioned at the outer round side of the electrode assembly than a bottom 38a. Here, the outer round side (Do) of the electrode assembly is the left side of FIG. 3, and the inner round side (Di) is the right side. A direction from the bottom 38a toward the head 33b of the columnar particle 38 and a direction N normal to a current collector 35 form an angle β3.

When the columnar particle 38 expands, for example, by absorbing lithium ions, a force (F3') in an oblique direction acts on a point R of force application in the bottom 38a. However, in the electrode assembly, the head 38b of the columnar particle 38 is pressed with the separator, etc. Therefore, with respect to the current collector 35, a force (F3) in an opposite direction to F3' acts on the point R of force application. At this time, a component f3 parallel to the current collector 35 of F3 acts in such a manner as to push the current collector 35 toward the inner round side (Di) of the electrode assembly. As a result, in FIG. 3, the current collector moves toward the inner round side of the electrode assembly as a whole.

When the electrode moves toward the inner round side of the electrode assembly as a whole, looseness occurs in the electrode assembly. Specifically, in the invention, when the active material expands, the electrode assembly slightly gets loose, which creates minor gaps in the electrode assembly. This relieves the stress caused by the expansion of the active material, and thus suppresses the breakage in the active material layer. Moreover, the pressure from the electrode to the separator is weakened, which makes it easy for the separator to maintain the shape of its micropores.

The angle β formed between an axis from the bottom toward the head of columnar particles and a direction normal to the current collector (angle β3 in FIG. 3) is preferably 20° or more and 70° or less, and more preferably 25° or more and 50° or less. The each angle β, in all the columnar particles included in the active material layer, may be the same or different. However, it is preferable that the angle β of every columnar particle falls within the range of 20° or more and 70° or less. When the angle β is less than 20°, the direction of a force produced during the expansion of the active materiel (F3' in FIG. 3) approaches the direction normal to the current collector, and thus the amount of movement of the current collector caused by the expansion of the active material is reduced, for example, to approximately one-third or less. This reduces the effect of the invention. On the other hand, when the angle β exceeds 70°, the adhering strength between the current collector and the bottom of the columnar particles is reduced, and thus the effect of the invention is reduced.

In addition, in the case of increasing the angle β to greater than 70°, there is difficulty in forming an active material layer by vapor phase process. For example, the incident direction to the current collector of the vapor of an active material source must be made closer to the direction substantially parallel to the surface of the current collector (for example, approximately within 10°). As a result, the utilization efficiency of the active material source is reduced. As such, this is disadvantageous in terms of actual productivity.

Figure 4:
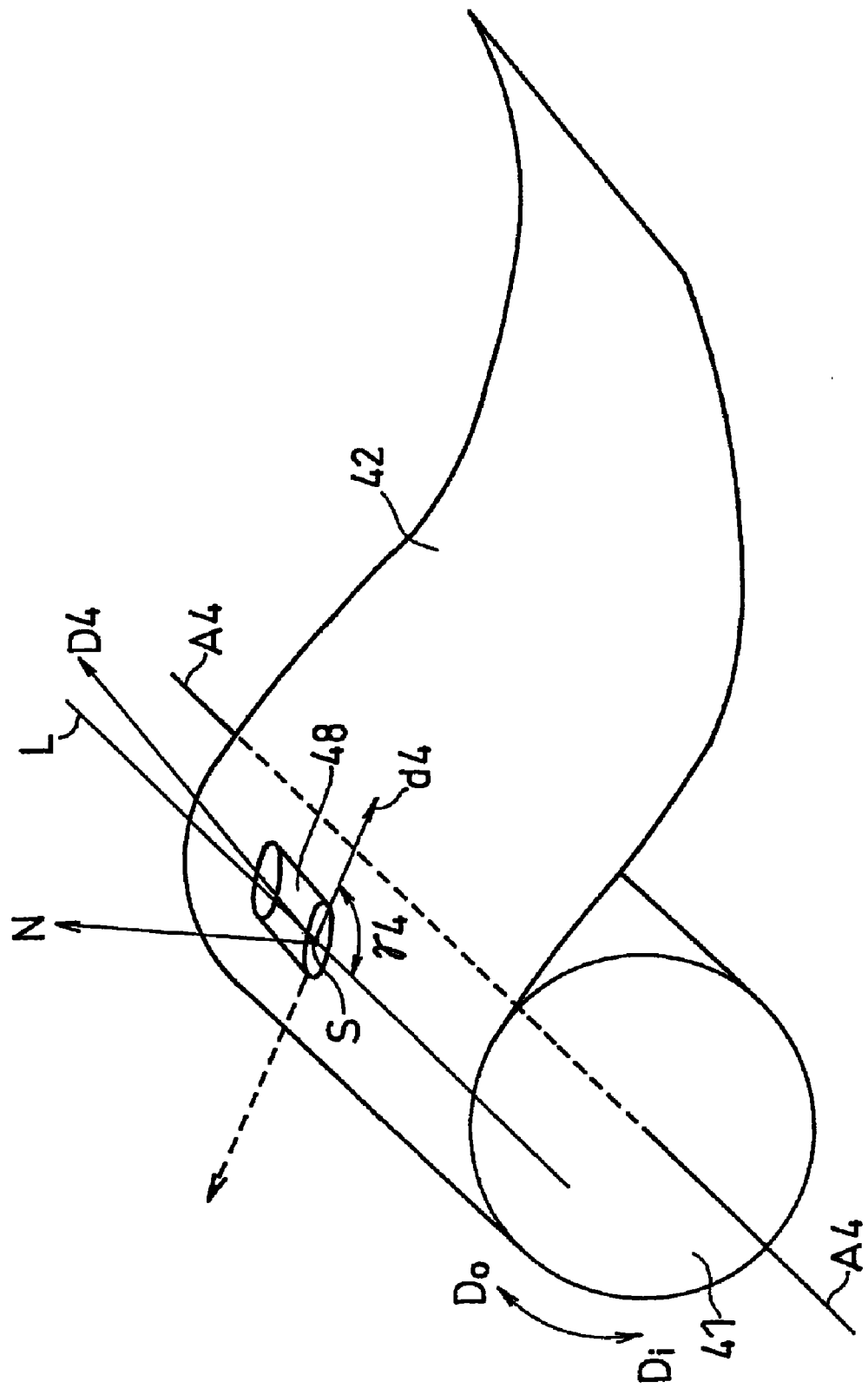
[FIG. 4] A perspective view conceptually showing one of the columnar particles formed on a current collector of an electrode included an electrode assembly.

FIG. 4 is a perspective view conceptually showing only one of the columnar particle 48 formed on a current collector of an electrode 42 included an electrode assembly 41. FIG. 4 shows a relation between a component d4 parallel to the current collector of a direction D4 from the bottom toward the head of the columnar particle 48 (a growth direction of the columnar particle 48), and a winding axis A4 of the electrode assembly. A straight line L passing through a point S in the bottom of the columnar particle 48 and being in parallel with the winding axis A4 forms an angle γ4 with the component d4 parallel to the current collector of the growth direction D4 of the columnar particle 48. The angle γ4 is synonymous with the angle γ formed between a component parallel to the current collector of the growth direction D4 and the winding axis A4 of the electrode assembly 41. Here, in the point S, the inner round side is the direction shown in an arrow of dotted line (the left side of FIG. 4) and an outer round side is the direction opposite thereto. Accordingly, the direction of d4 coincides with a direction from the inner round side toward the outer round side in the electrode assembly.

The angle γ formed between a component parallel to the current collector of a direction from the bottom toward the head of columnar particles (a growth direction of columnar particles) and a winding axis of the electrode assembly is preferably around 90°, for example, 80° or more and 100° or less. In other words, it is preferable that the component parallel to the current collector of the direction from the bottom toward the head of columnar particles is perpendicular or nearly perpendicular to the winding axis. The angle γ of around 90° allows easy movement of the current collector during the expansion of the active material. As a result, looseness easily occurs in the electrode assembly, and this makes it easy to relieve the expansion stress of the active material and to secure the micropores in the separator. As such, an effective improvement in cycle characteristics and rate characteristics of the battery can be expected.

Figure 5:
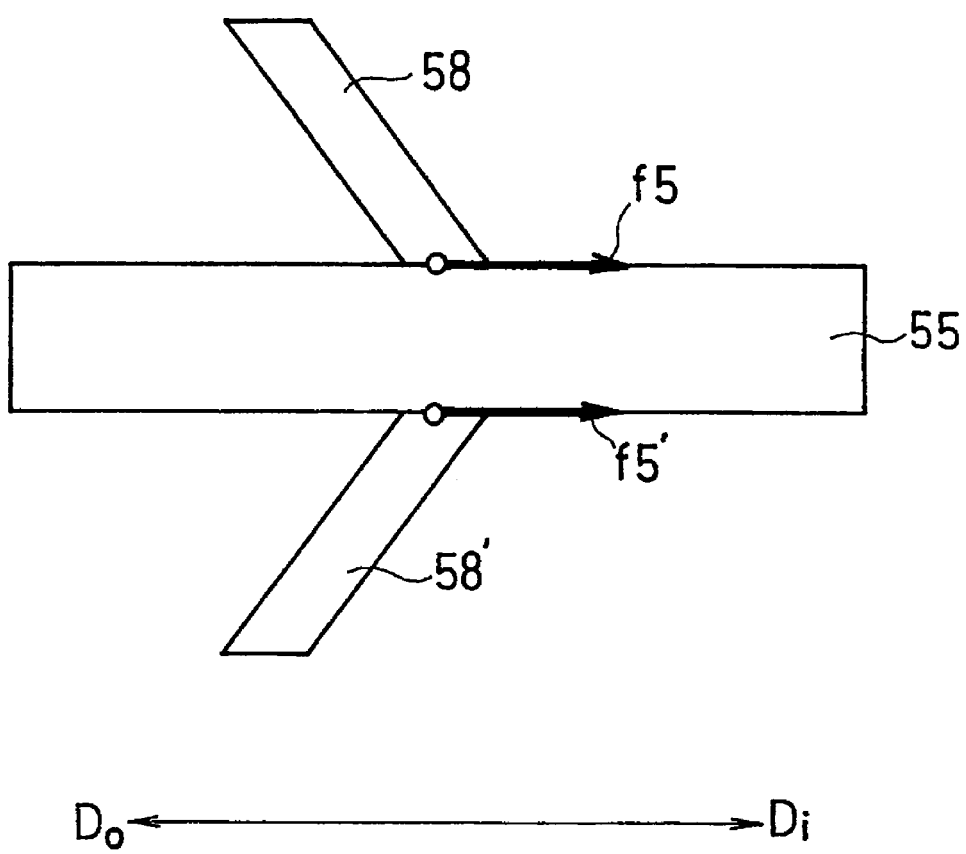
[FIG. 5] A diagram showing dynamic relations among a current collector, columnar particles included in a first active material layer carried on one face of the current collector, and columnar particles included in a second active material layer carried on the other face of the current collector.

In the case where the active material layer is formed on both faces the current collector, the effect of the invention is increased. FIG. 5 shows dynamic relations among a current collector 55, columnar particles 58 included in a first active material layer carried on one face of the current collector, and columnar particles 58' included in a second active material layer carried on the other face. In this diagram, only one columnar particle 58 included in the first active material layer and only one columnar particle 58' included in the second active material layer are conceptually illustrated for convenience. The inner round side (Di) of the electrode assembly is the right side of FIG. 5 and the outer round side (Do) is the left side.

In the columnar particle 58 and the columnar particle 58' on both faces of the current collector 55, forces (f5 and f5') to move the current collector 55 toward the inner round side of the electrode assembly are produced during the expansion for the same reason as described in the case of FIG. 3. This means that the force to move the electrode toward the inner round side is doubled as compared with the case where the active material layer includes columnar particles on only one face. Consequently, the effect of the invention is increased.

Figure 6A:
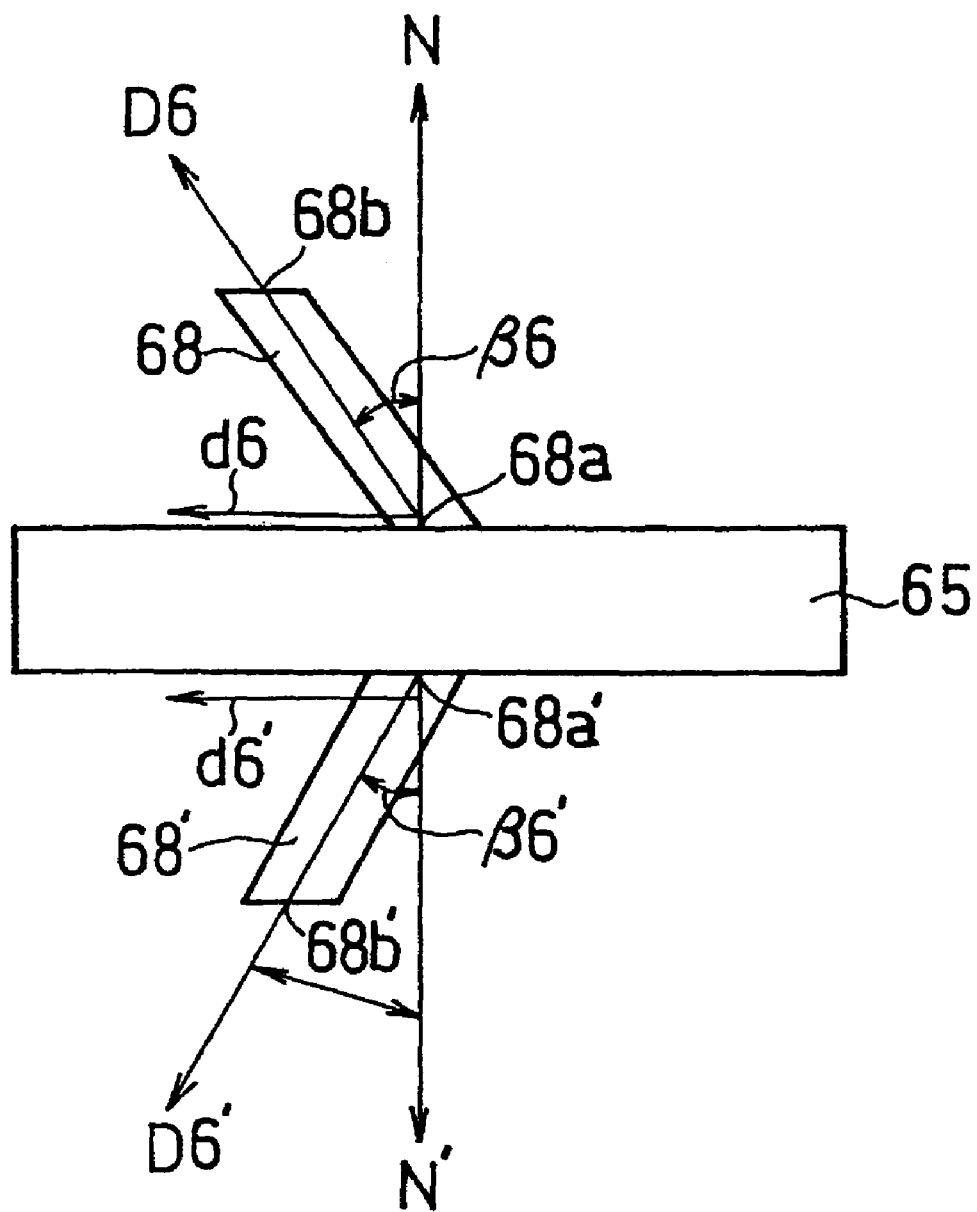
[FIG. 6A] A schematic diagram showing relations among a current collector, columnar particles included in a first active material layer carried on one face of the current collector, and columnar particles included in a second active material layer carried on the other face of the current collector.

FIG. 6A is a schematic diagram showing relations among a current collector 65, columnar particles 68 included in a first active material layer carried on one face of the current collector, and columnar particles 68' included in a second active material layer carried on the other face. A direction D6 from a bottom 68a toward a head 68b of the columnar particle 68 and a direction N normal to the current collector 65 form an angle β6. Similarly, a direction D6' from a bottom 68a' toward a head 68b' of the columnar particle 68' and a direction N' normal to the current collector 65 form an angle β6'.

Figure 6B:
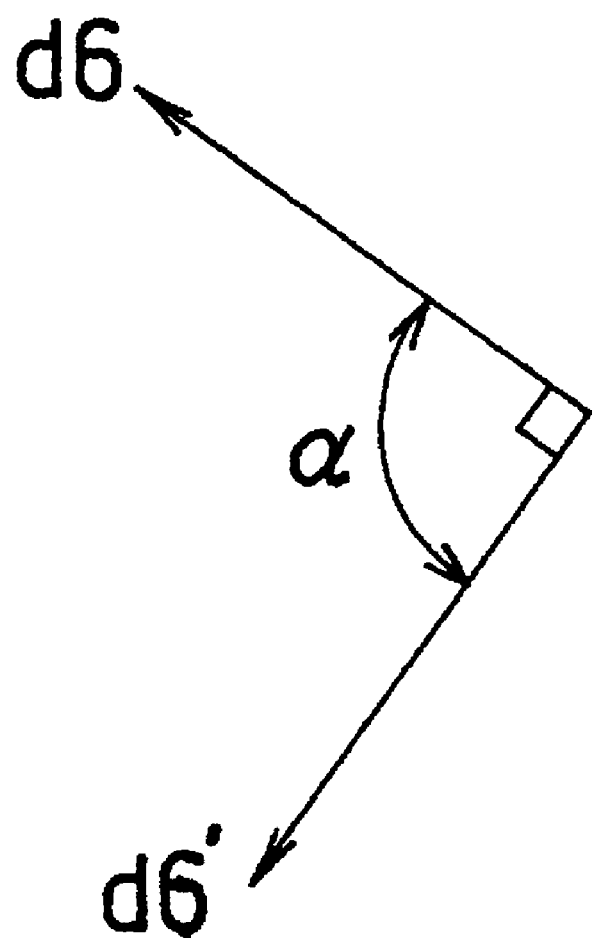
[FIG. 6B] A conceptual diagram showing an example of directions of pressure applied to a separator during the expansion of columnar particles, in a plane parallel to a current collector.
Figure 6C:
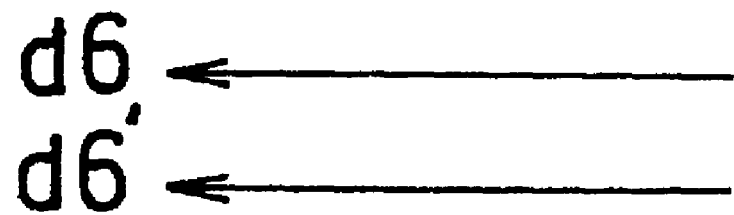
[FIG. 6C] A conceptual diagram showing another example of directions of pressure applied to a separator during the expansion of columnar particles, in a plane parallel to a current collector.

An angle α formed between a component d6 parallel to the current collector 65 of D6 and a component d6' parallel to the current collector 65 of D6' is preferably 0° or more and 90° or less. When the columnar particles expand, pressure is applied to the separators adjacent to both faces of the electrode. The components parallel to the current collector of the pressure applied to the separators act in the directions of d6 and d6'. When the angle α is 90°, a force applied to the separator adjacent to one face of the electrode and a force applied to the separator adjacent to the other face of the electrode are orthogonal to each other (See FIG. 6B). On the other hand, when the angle α is 0°, forces parallel to each other are applied to the separator on both sides (See FIG. 6C). As a reaction to this, also to the current collector 65, an orthogonal force is applied when the angle α is 90°, and a parallel force is applied when the angle α is 0°. The forces applied to the current collector at this time act in the opposite directions to d6 and d6'. FIG. 6B and FIG. 6C each show a relation between d6 and d6' in a plane parallel to the current collector.

In view of suppressing the occurrence of wrinkles on the separator and the current collector during the expansion of the columnar particles, the angle α is preferably 0° or more and 60° or less, more preferably 0° or more and 30° or less, and most preferably 0°.

It is preferable that the structures of the active material layers on both faces of the current collector are substantially symmetric to each other. For example, in the case of FIG. 6A, it is preferable that the angle α=0° and the angle β6=β6' are satisfied, the thickness of the first active material layer carried on one face of the current collector 65 and the thickness of the second active material layer carried on the other face are substantially equal. In such a symmetric state, it is not necessary that the individual columnar particles are perfectly plane-symmetric about the current collector, but it will suffice if the active material layers on both faces, as a whole, are plane-symmetric in average.

The columnar particles may be curved. In other words, the columnar particles may be formed in a bow shape. For example, the columnar particles may be curved such that the current collector side thereof is projected or the current collector thereof is depressed. Among these, it is preferable that the columnar particles are curved such that the current collector side thereof is projected.

Figure 7:
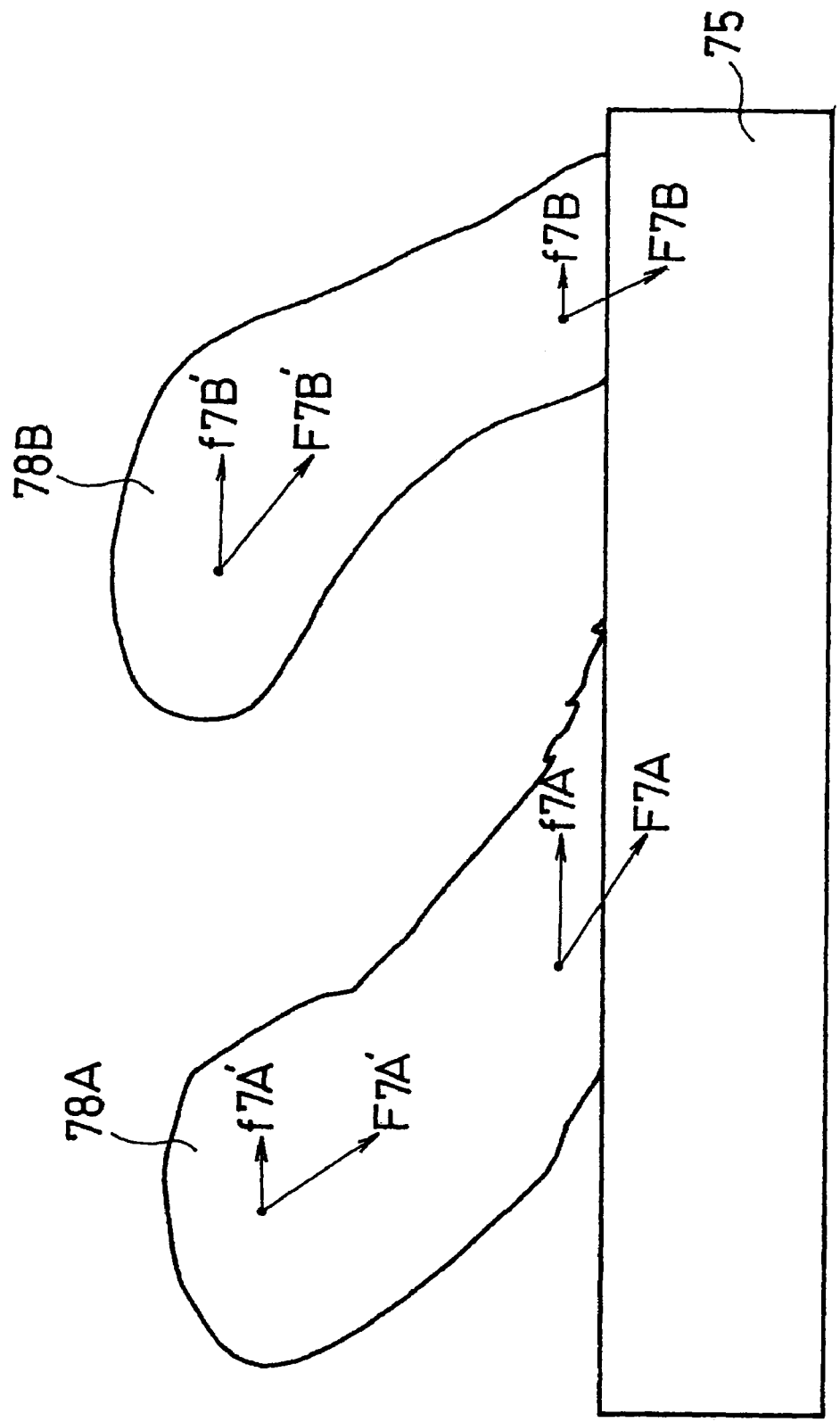
[FIG. 7] A diagram showing examples of a columnar particle curved such that a current collector side thereof is projected and a columnar particle curved such that a current collector side thereof is depressed.

FIG. 7 shows examples of a columnar particle 78A curved such that the current collector 75 side thereof is projected and a columnar particle 78B curved such that the current collector 75 side thereof is depressed. In the case where columnar particles are curved such that the current collector side thereof is projected, compared with the case where the current collector side thereof is depressed, during the expansion of the columnar particles, the electrode is moved easily (the electrode assembly gets easily loose). This is because that a component (f7A) parallel to the current collector of a force (F7A) produced in the vicinity of the bottom of the columnar particle 78A is greater than a component (f7A') parallel to the current collector of a force (F7A') produced in the vicinity of the head of the columnar particle, and this difference makes the electrode move easily. In the case where the columnar particles are curved such that the current collector side thereof is depressed, conversely, a component (f7B) parallel to the current collector of a force (F7B) produced in the vicinity of the bottom of the columnar particle is smaller than a component (f7B') parallel to the current collector of a force (F7B') produced in the vicinity of the head.

Figure 8:
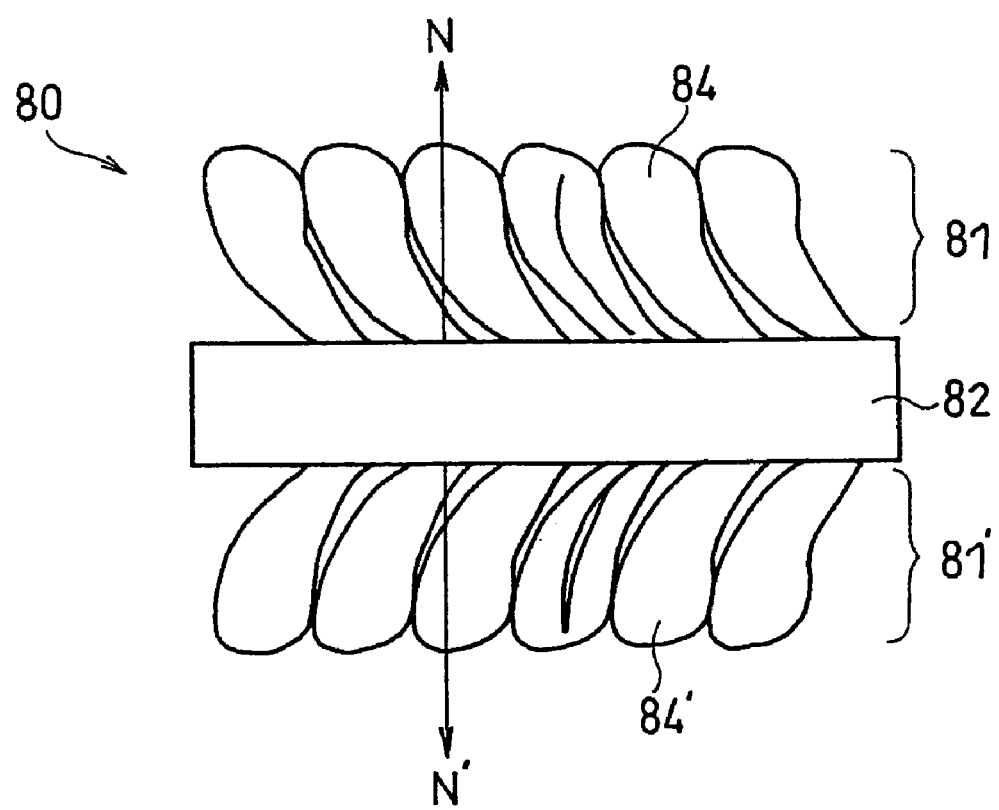
[FIG. 8] A partially cross-sectional diagram of an example of an electrode preferably used for a battery of the invention.

FIG. 8 is a partially cross-sectional diagram of an example of an electrode preferably used for a battery of the invention. An electrode 80 has a first active material layer 81 formed on a first face (the upper face in FIG. 8) of a sheet-like current collector 82 and a second active material layer 81' formed on the other face (the lower face in FIG. 8) of the current collector 82. The first active material layer 81 includes a plurality of particles 84 slanting with respect to a direction N normal to the current collector 82. Similarly, the second active material layer 81' includes a plurality of particles 84' slanting with respect to a direction N' normal to the current collector 82. The plurality of particles 84 and the plurality of particles 84' are both grown in a bow shape such that the current collector side thereof is projected.

Figure 9:
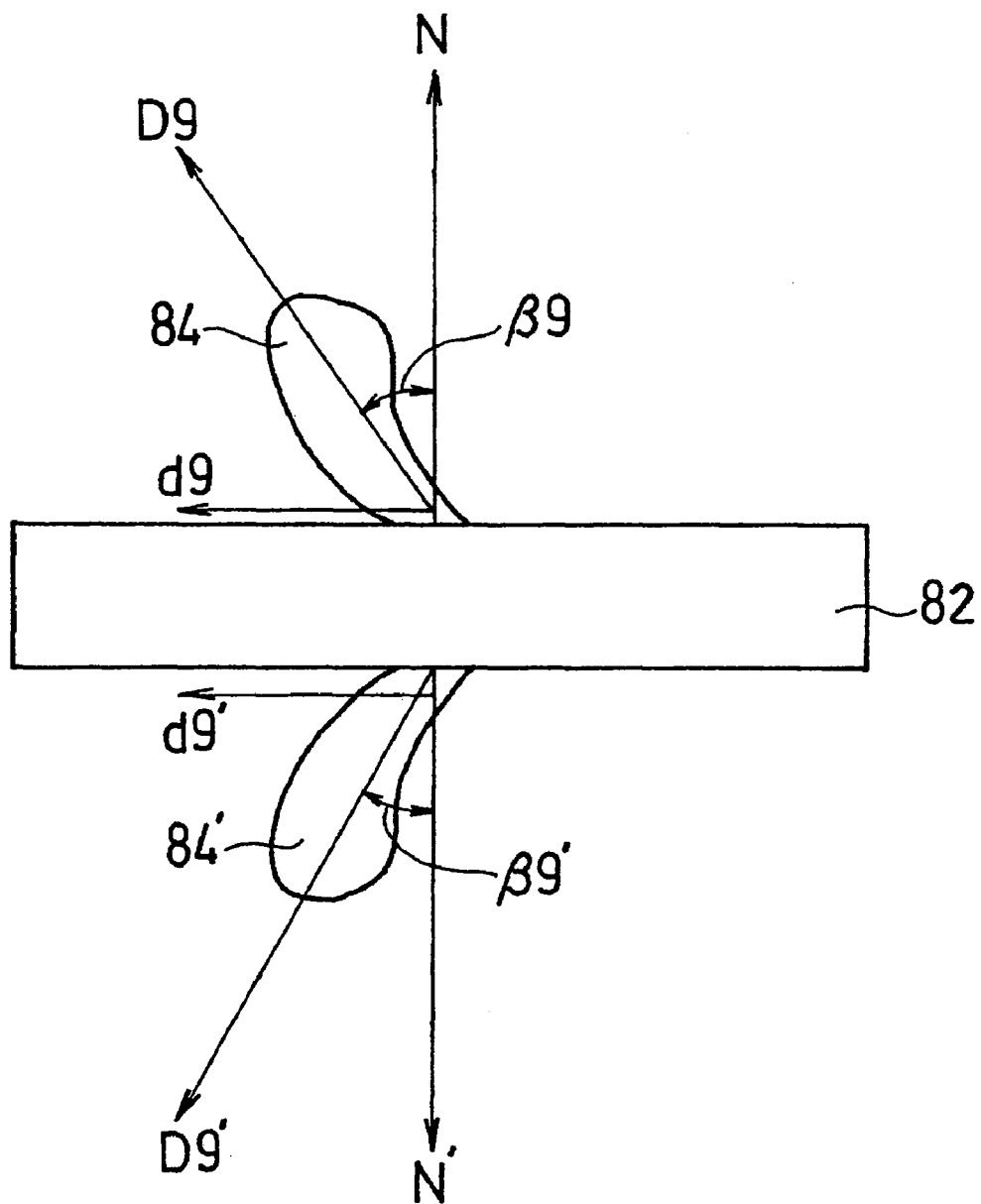
[FIG. 9] A diagram conceptually showing only one of the columnar particles included in the first active material layer and only one of the columnar particles included in the second active material layer in FIG. 8.
Figure 20:
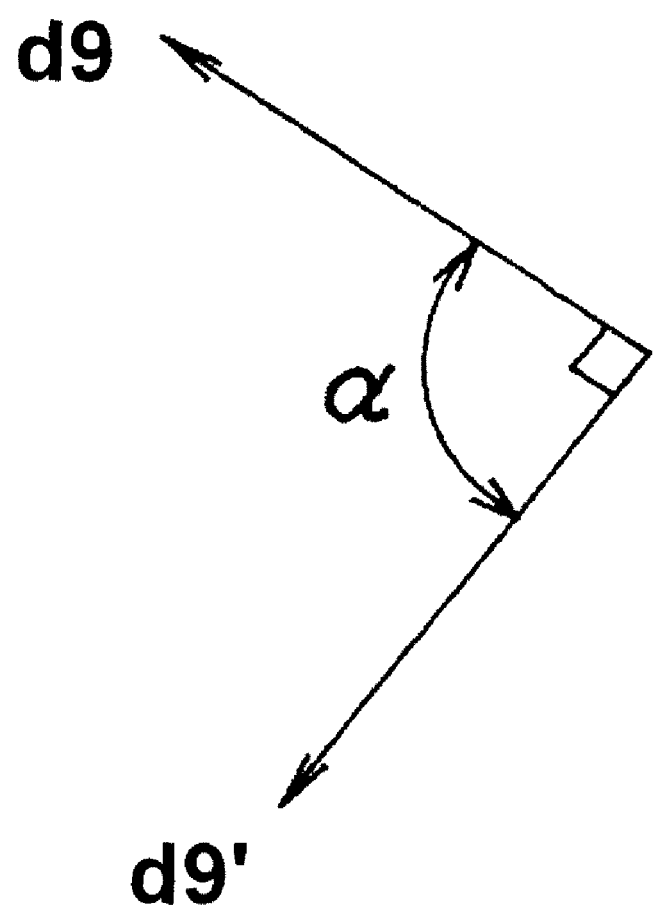
[FIG. 20] A conceptual diagram showing an example of directions of pressure applied to a separator during the expansion of columnar particles, in a plane parallel to a current collector.

FIG. 9 conceptually shows only one of columnar particles 84 included in the first active material layer and only one of columnar particle 84' included in the second active material layer. A growth direction D9 of the particle 84 (i.e., a direction from the bottom toward the head of the particle 84) forms an angle β9 with a normal direction N. Similarly, a growth direction D9' of the particle 84' (i.e., a direction from the bottom toward the head of the particle 84') forms an angle β9' with a normal direction N'. Here, a component parallel to the current collector 82 of D9 is denoted by d9. Similarly, a component parallel to the current collector 82 of the direction D9' is denoted by d9'. An angle α formed between the direction d9 and the direction d9', as shown in FIG. 20, is 0° or more and 90° or less. The angle α is preferably 0° or more and 60° or less, more preferably 0° or more and 30° or less, and most preferably 0°.

It is not necessary that the angles β9 and β9' are the same. The angles β9 and β9' each are preferably 20° or more and 70° or less, and more preferably 25° or more and 50° or less. It is also not necessary that every particle 84 in the first active material layer 81 has the same angle β9, but it will suffice if each particle has an angle of 20° or more and 70° or less. Similarly, it is not necessary that every particle 84' in the second active material layer 81' has the same angle β9', but it will suffice if each particle has an angle of 20° or more and 70° or less.

Figure 10:
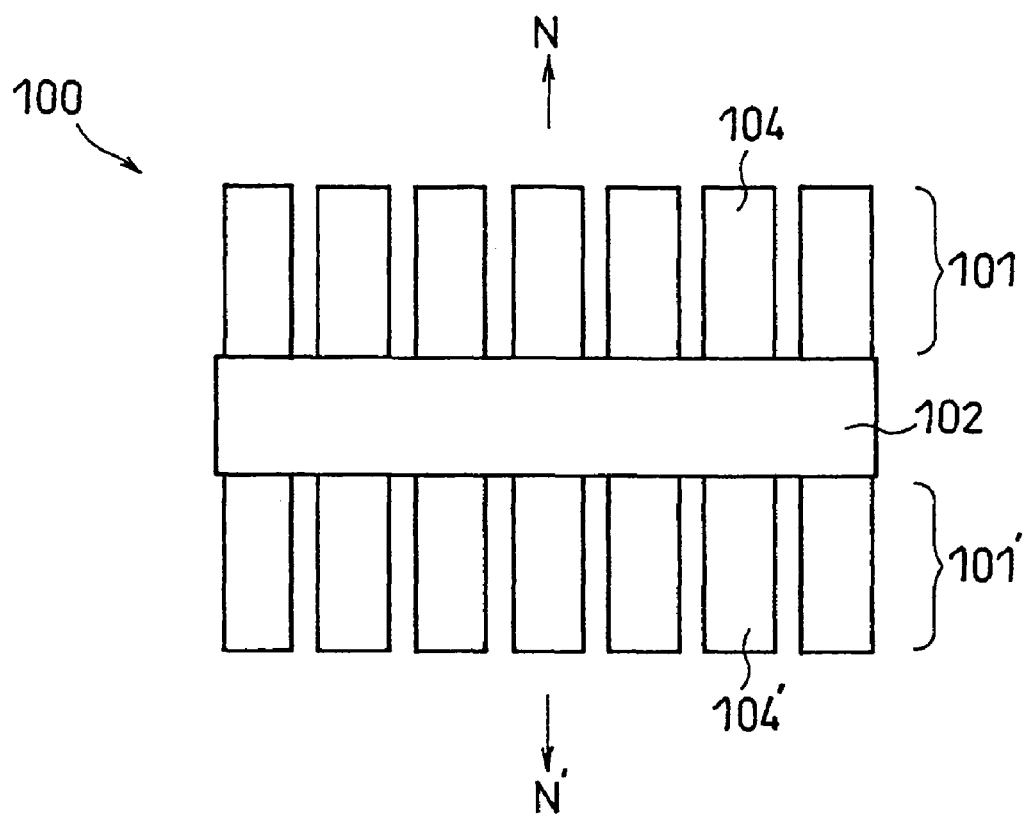
[FIG. 10] A conceptual diagram showing an example of the conventional electrode.

In the case of an electrode 100 as shown in FIG. 10, a first active material layer 101 and a second active material layer 101' are carried on a current collector 102, and particles 104 and 104' included in these active material layers are formed in parallel with directions N and N' normal to the current collector 102. In a battery using such the electrode 100, during the expansion of the active material, pressure is applied to the separator and the electrode in a direction perpendicular thereto. On the other hand, in a battery using such the electrode 80 as shown in FIG. 8, pressure is applied to the separator and the electrode in a direction oblique thereto. In the latter case, the separator and the active material layer will suffer less damage. As a result, a battery excellent in rate characteristics and cycle characteristics can be obtained.

The active material included in the active material layer is not particularly limited as long as it electrochemically reacts with lithium. However, in the case of the negative electrode active material, it is preferable that the material includes at least one selected from the group consisting of a silicon simple substance, a silicon alloy, a compound containing silicon and oxygen, a compound containing silicon and nitrogen, a tin simple substance, a tin alloy, a compound containing tin and oxygen, and a compound containing tin and nitrogen, since the material as such has a comparatively high reactivity with lithium and is expected to have a high capacity. When these active materials are used, the effect of the invention becomes remarkable.

In the case of the positive electrode active material, it is preferable that the material includes, for example, a transition metal oxide. For example, a lithium-containing transition metal oxide such as lithium cobaltate ($LiCoO_2$), lithium nickelate ($LiNiO_2$) or lithium manganate ($LiMn_2O_4$) may be used, but not limited thereto. In the case where the negative electrode active material layer includes columnar particles slanting with respect to a direction normal to the current collector, the positive electrode active material layer may be composed of columnar particles as in the case of the negative electrode active material layer, or composed of a material mixture including a positive electrode active material and a binder.

The thickness of the active material layer, although being dependent on the performance of a battery to be fabricated, is in the range approximately 3 to 40 μm. If the thickness of the active material layer is less than 3 μm, the proportion of the active material in the entire battery becomes small, and the energy density of the battery is reduced. On the other hand, if the thickness of the active material layer exceeds 40 μm, the stress in the interface between the current collector and the active material layer is increased, causing a possibility of deformation of the current collector, and the like.

In light of the reactivity between the active material and lithium, it is preferable that the active material is amorphous or of low crystallinity. The term "low crystallinity" as used here refers to a state in which the particle size of crystal grains (crystallites) is 50 nm or less. The particle size of crystal grains is calculated by Scherrer's formula using half width of the highest peak of intensity in a diffraction pattern obtained by X-ray diffraction analysis. The term "amorphous" is used when no sharp peak is observed in the range of 2θ=15 to 40° in a diffraction pattern obtained by X-ray diffraction analysis, but a broad peak (for example, a halo pattern) is observed.

For the current collector of the negative electrode, for example, a metal foil containing cupper, nickel and the like may be used. For the current collector of the positive electrode, for example, a metal foil containing aluminum, nickel, titanium and the like may be used. It is preferable that the metal foil is a sheet of continuous length. In light of the strength of the current collector, the volume efficiency of the battery, the ease of handling of the current collector, and the like, it is preferable that the thickness of the metal foil is 4 to 30 μm, and more preferably 5 to 10 μm. Although the surface of the metal foil may be smooth, a metal foil with a rough surface having a surface roughness Ra of approximately 0.1 to 4 μm may be used in order to increase the adhesion strength with the active material layer. The rough surface of the metal foil also serves to form gaps between the columnar particles included in the active material layer. In view of the adhesion strength with the active material layer, costs, and the like, it is preferable to use a metal foil of Ra=0.4 to 2.5 μm.

Examples of a method for fabricating an electrode for use in the invention will be hereinafter described.

The electrodes as shown in FIGS. 1 to 9 are obtained by allowing an active material layer to be carried on a current collector in a predetermined method. The method for allowing an active material layer to be carried on a current collector is not particularly limited as long as the method can form columnar particles slanting with respect to a direction normal to the current collector. However, it is preferable to use a dry process such as a vapor deposition method, a sputtering method or a CVD method. For example, by evaporating an active material source so that the vapor flux is incident obliquely on the surface of the current collector, an active material layer including columnar particles slanting in a direction normal to the current collector can be obtained.

Figure 11:
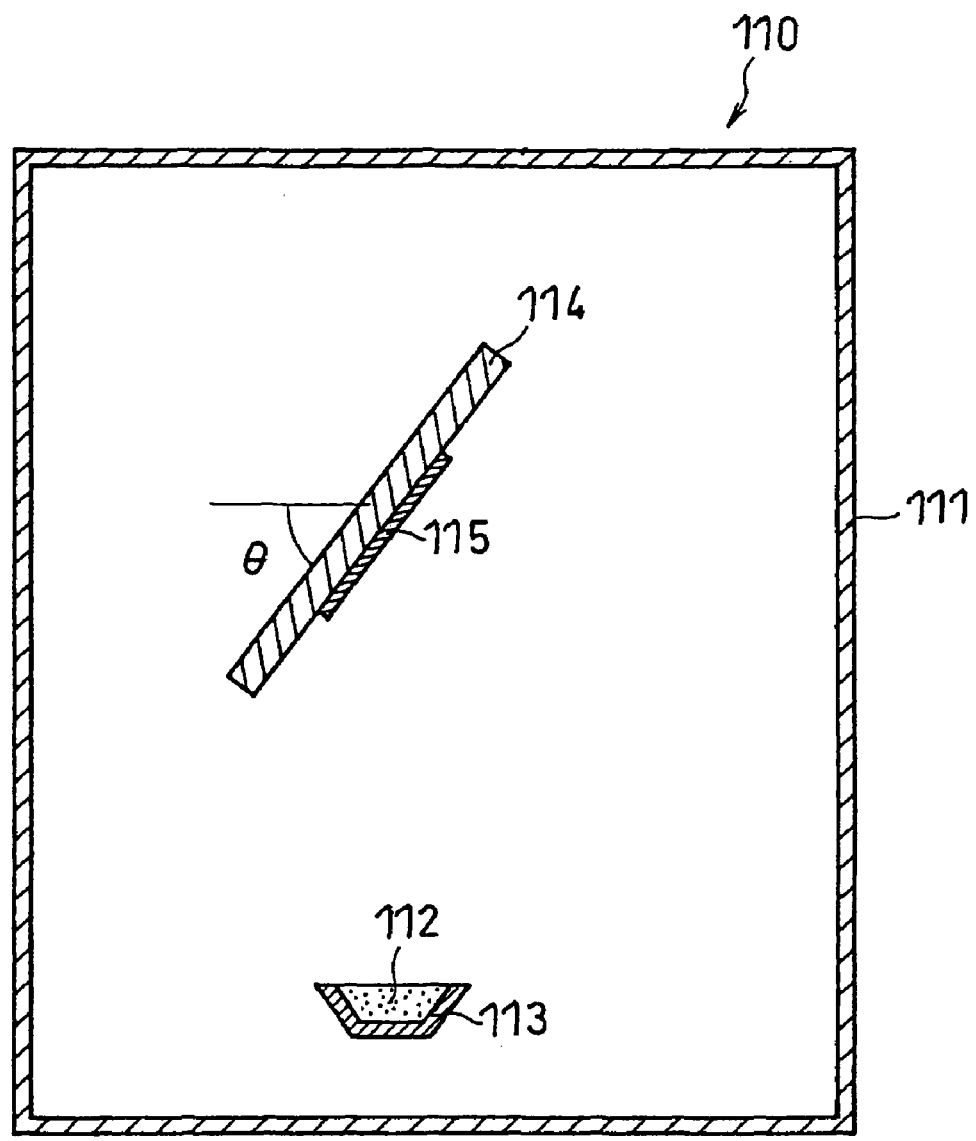
[FIG. 11] A cross-sectional schematic view showing an example of a production apparatus for an electrode.

FIG. 11 is a cross-sectional schematic view showing an example of a production apparatus for an electrode. A production apparatus 110 comprises a vacuum chamber 111 and an exhaust pump (not shown) for keeping the interior thereof under vacuum. A flat fixing table 114 is placed above a container 113 containing an active material source 112 in such a manner that the table forms an angle θ with a horizontal plane. On the surface of the fixing table 114, a current collector 115 is fixed. A heating means is used to heat and evaporate the active material source.

In the case of forming an active material layer containing an oxide or a nitride, an active material source of the oxide or the nitride may be evaporated directly, or an active material source not containing oxygen or nitrogen (for example, silicon or tin) may be evaporated in an oxygen atmosphere or a nitrogen atmosphere. In the case of forming an active material layer on both faces of the current collector, after a first active material layer is formed on one face of the current collector, the current collector is turned upside down to form a second active material layer on the other face.

Figure 12:
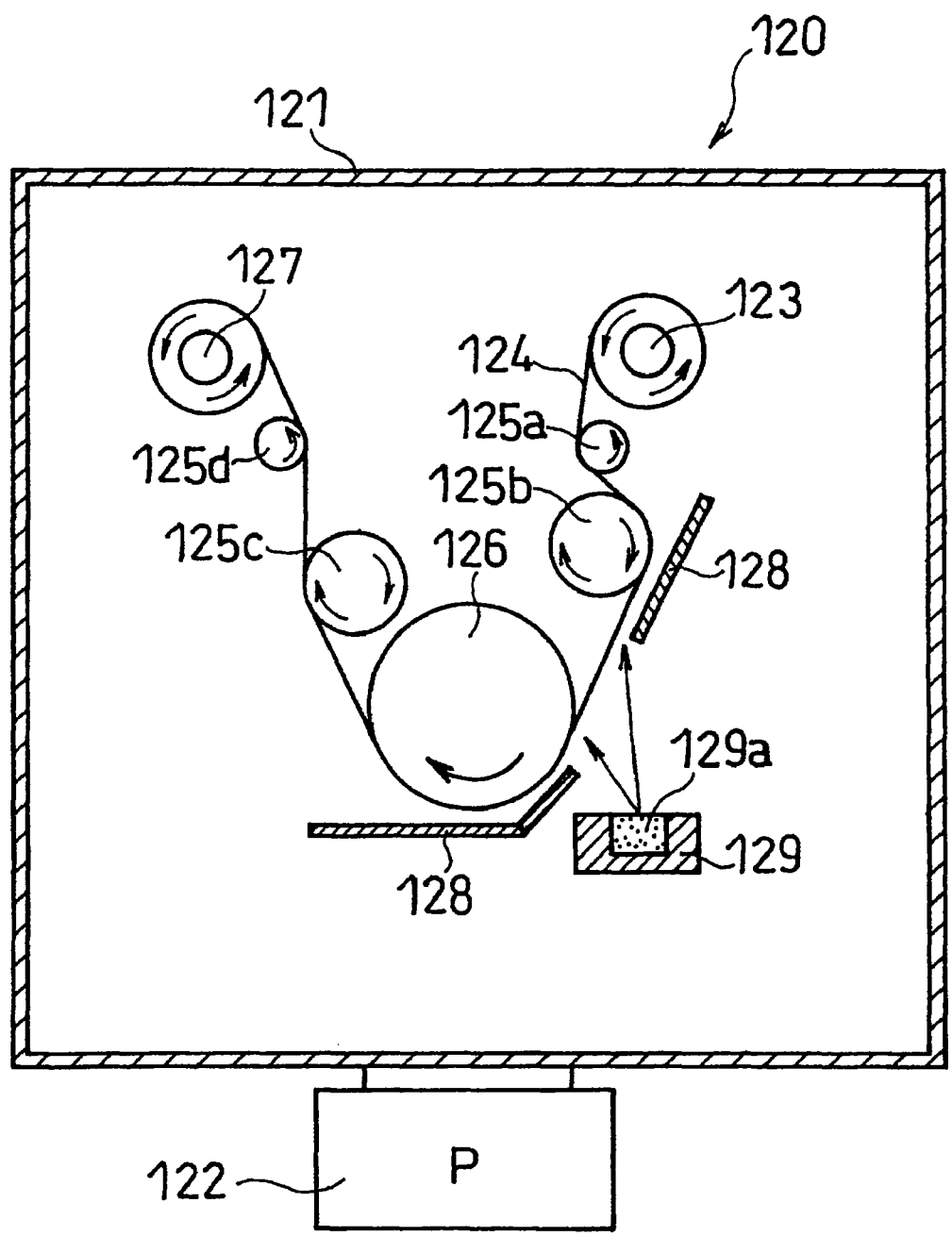
[FIG. 12] A cross-sectional schematic view showing another example of a production apparatus for an electrode.

FIG. 12 is a cross-sectional schematic view showing another example of a production apparatus for an electrode. A production apparatus 120 is suitable for the case of continuously forming an active material layer on a current collector (metal foil) of continuous length. The production apparatus 120 comprises a vacuum chamber 121 and an exhaust pump 122 for keeping the interior thereof under vacuum. A current collector 124 of continuous length send from a feeding roller 123 is transferred onto transfer rollers 125a and 125b and runs along the periphery of a cylindrical can roller 126. The current collector 124 and the can roller 126 are shielded from below with a shielding plate 128 having an opening. The opening of the shielding plate 128 is provided in such a manner that it is positioned between the transfer roller 125b and the can roller 126. In this state, a container 129 containing an active material source 129a is placed below the opening of the shielding plate 128 and the active material source is evaporated. By doing this, during the time when the current collector 124 moves obliquely from the transfer roller 125b until it reaches the periphery of the can roller 126, the vapor of the active material source supplied from below is incident obliquely on the surface of the current collector. Thereafter, the current collector carrying an active material layer (electrode) is transferred to transfer rollers 125c and 125d, and then wound on a winding roller 127.

An incident angle to the surface of the current collector of the vapor of the active material source supplied from below (an angle formed between a direction normal to the current collector and an incident direction of the vapor of the active material source) is gradually reduced as the current collector from the transfer roller 125b approaches the periphery of the can roller 126. Consequently, the columnar particles are curved such that the current collector side thereof is projected. If the transfer direction of the current collector is reversed, the columnar particles are curved such that the current collector side thereof is depressed. Moreover, as the current collector from the transfer roller 125b approaches the periphery of the can roller 126, the vapor amount of the active material source present in the vicinity of the current collector is increased. It should be noted that, in association with the growth of the columnar particles, since the exposure of the head of the columnar particles is increased, the diameter of the columnar particles around the head becomes greater than that around the bottom.

Figure 13:
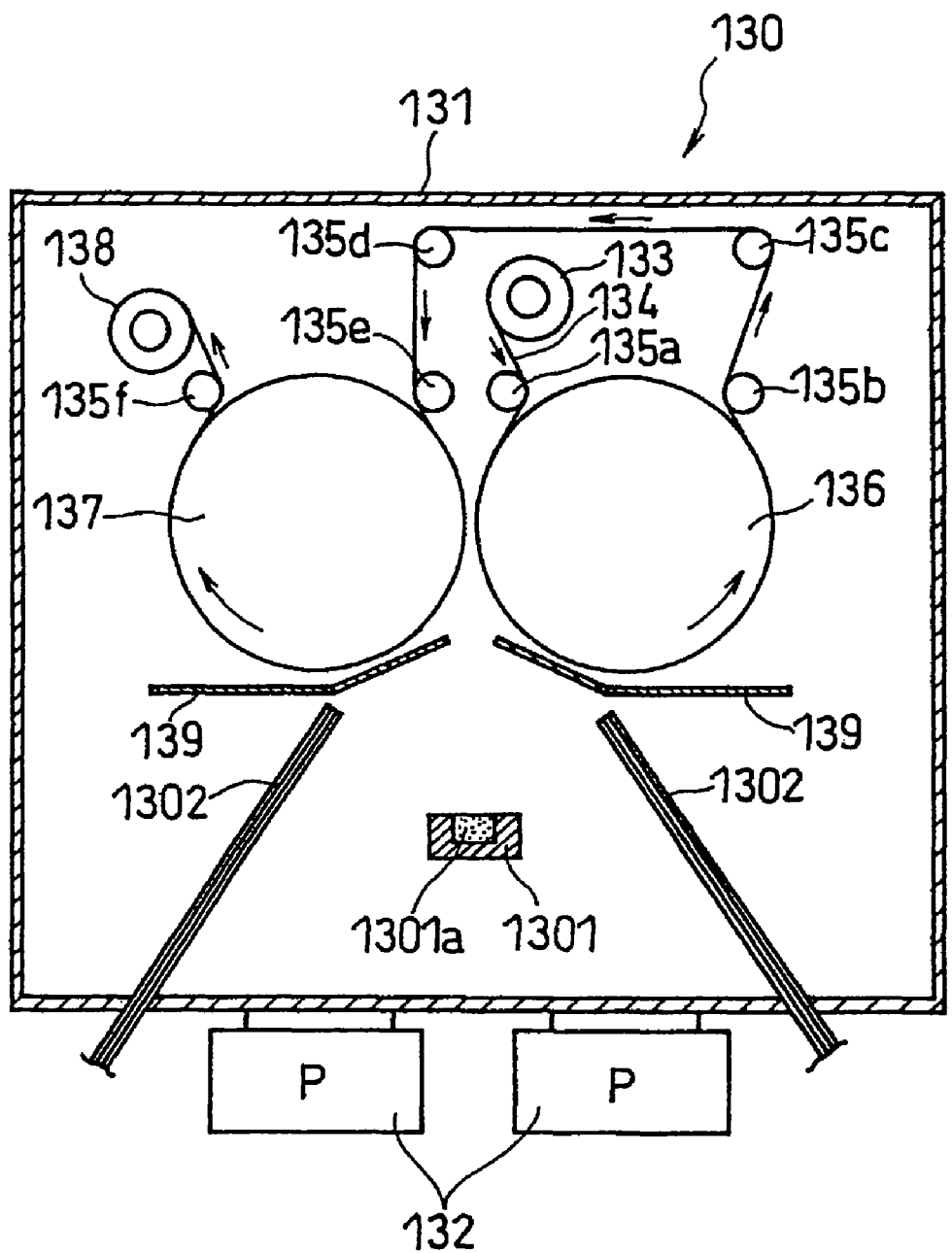
[FIG. 13] A cross-sectional schematic view showing still another example of a production apparatus for an electrode.

FIG. 13 is a cross-sectional schematic view showing still another example of a production apparatus for an electrode. A production apparatus 130 comprises a vacuum chamber 131 and an exhaust pump 132 for keeping the interior thereof under vacuum. From a gas-introducing pipe 1302, oxygen or nitrogen can be introduced in the interior of the vacuum chamber 131 as needed. A current collector 134 of continuous length send from a feeding roller 133 passes through a transfer roller 135a and runs along the periphery of a cylindrical first can roller 136. Thereafter, the current collector 134 passes through transfer rollers 135b to 135e and runs on the periphery of a cylindrical second can roller 137 in such a state that the current collector is turned upside down. Finally, the current collector passes through a transfer roller 135f and is wound on a winding roller 138.

The first can roller 136 and the second can roller 137 are shielded from below with a shielding plate 139 having an opening. The opening of the shielding plate 139 is provided in such a manner that it is positioned between the periphery of the first can roller 136 and the periphery of the second can roller 137. In this state, a container 1301 containing an active material source 1301a is placed below the opening of the shielding plate 139 and the active material source is evaporated. The active material source is heated by a heater (not shown) and evaporated.

The evaporated active material source passes through the opening of the shielding plate 139 and is incident on the peripheries of the first can roller 136 and the second roller 137. At this time, the active material source is incident from a direction slanting with respect to a direction normal to the current collector 134. On the periphery of the first can roller 136, an active material is deposited on one face of the current collector; and on the periphery of the second roller 137, the active material is deposited on the other face of the current collector.

An incident angle to the surface of the current collector of the vapor of the active material source supplied from below (an angle formed between a direction normal to the current collector and an incident direction of the vapor of the active material source) is gradually reduced as the current collector moves downward along the periphery of the first can roller 136 or the second can roller 137. Consequently, the columnar particles are curved such that the current collector side thereof is projected. It should be noted that in the case where an active material is deposited on the current collector moving along the periphery of the can roller, compared with the case where an active material is deposited on the current collector moving in a straight line as in the production apparatus of FIG. 12, the degree of curve of the columnar particles can be increased and the utilization efficiency of the vapor of the active material source is enhanced. Moreover, as the current collector moves downward along the periphery of the first can roller 136 or the second can roller 137, the vapor amount of the active material source present in the vicinity of the current collector is increased. It should be noted that, in association with the growth of the columnar particles, since the exposure of the head of the columnar particles is increased, the diameter of the columnar particles around the head becomes greater than that around the bottom.

Figure 14:
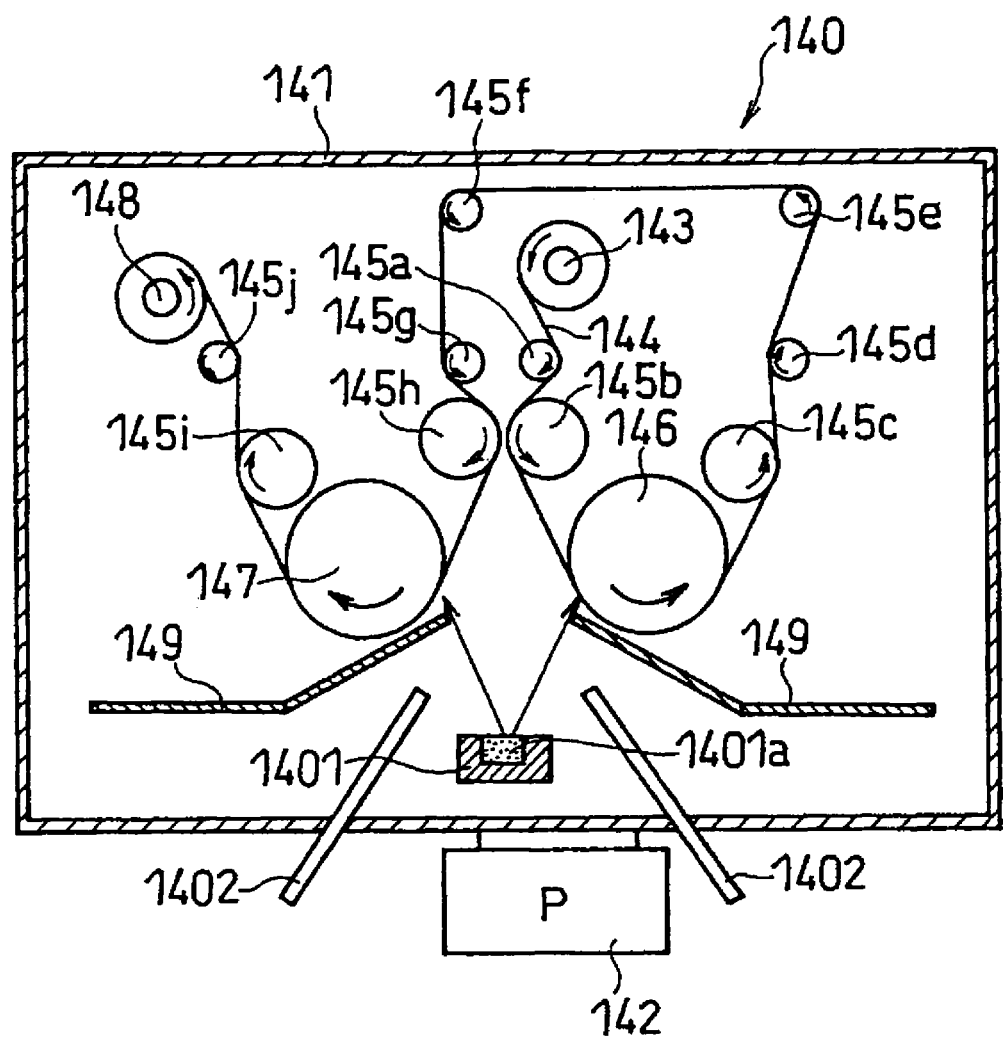
[FIG. 14] A cross-sectional schematic view showing yet another example of a production apparatus for an electrode.

FIG. 14 is a cross-sectional schematic view showing yet another example of a production apparatus for an electrode. A production apparatus 140 comprises a vacuum chamber 141 and an exhaust pump 142 for keeping the interior thereof under vacuum. From a gas-introducing pipe 1402, oxygen or nitrogen can be introduced in the interior of the vacuum chamber 141 as needed. A current collector 144 of continuous length send from a feeding roller 143 passes through transfer rollers 145a and 145b and runs along the periphery of a cylindrical first can roller 146. Thereafter, the current collector 144 passes through transfer rollers 145c to 145h and runs on the periphery of a cylindrical second can roller 147 in such a state that the current collector is turned upside down. Finally, the current collector passes through transfer rollers 145i and 145j and is wound on a winding roller 148.

The first can roller 146 and the second can roller 147 are shielded from below with a shielding plate 149 having an opening. The opening of the shielding plate 149 is provided in such a manner that it is positioned between the periphery of the first can roller 146 and the periphery of the second can roller 147. In this state, a container 1401 containing an active material source 1401a is placed below the opening of the shielding plate 149 and the active material source is evaporated.

In the production apparatuses of FIG. 13 and FIG. 14, the diameters of the first can roller and the second can roller are equal, and the positions of the first can roller and the second can roller are symmetric to each other with respect to the position of the active material source. Accordingly, the growth directions of the columnar particles in the first active material layer formed on one face of the current collector and the columnar particles in the second active material layer formed on the other face are substantially symmetric to each other. If the first can roller and the second can roller are placed asymmetrically to each other with respect to the active material source, the growth directions of the columnar particles in the first active material layer and the columnar particles in the second active material layer will be asymmetric to each other.

The active material source is heated with a heater (not shown) such as a resistance heater, an induction heater or an electron beam heater. Such heating allows silicon or tin to evaporate. In the case of forming an active material layer on both faces of the current collector, after a first active material layer is formed on one face of the current collector, a second active material layer is formed on the other face. For a container for containing an active material source, a crucible or the like may be used.

In the case where oxygen gas or hydrogen gas is introduced into the vacuum chamber to evaporate silicon or tin in an oxygen atmosphere or a nitrogen atmosphere, an active material layer including a compound containing silicon and oxygen, a compound containing silicon and nitrogen, a compound containing tin and oxygen, a compound containing tin and nitrogen, and the like can be formed.

Although the foregoing methods for producing an electrode are suitable particularly for the case of fabricating a negative electrode, a similar method to these, with modification as needed, may be used also in the case of fabricating a positive electrode.

The electrodes obtained by the foregoing production methods are usually formed in a wound state, that is, have a roll shape. At this time, the head of the columnar particles is positioned at the outer round side or the inner round side of the electrode roll than the bottom. Thereafter, lithium is vapor-deposited on the active material layer as needed. This operation is typically preformed in order to compensate for the irreversible capacity amount of the active material.

The vapor deposition of lithium can be performed using metallic lithium in place of the active material source in the same manner as in the operation of vapor-depositing an active material on the current collector. Accordingly, the electrode after the vapor deposition of lithium is also formed in a roll shape, and the head of the columnar particles is positioned at the outer round side or the inner round side of the electrode roll than the bottom.

Thereafter, an operation of cutting the electrode in a predetermined width is typically performed. This operation includes steps of feeding an electrode roll, cutting and winding it. Accordingly, the electrode after cutting is also formed in a roll shape, and the head of the columnar particles is positioned at the outer round side or the inner round side of the electrode roll than the bottom. It is preferable that immediately before forming an electrode assembly, the head of the columnar particles is positioned at the inner round side of the electrode roll than the bottom. By starting the winding of a positive electrode, a negative electrode and a separator in this state, the bottom of the columnar particles comes closer to the winding axis of the electrode assembly than the head. Accordingly, an electrode assembly in which the head of the columnar particles is positioned at the outer round side of the electrode assembly than the bottom can be easily obtained.

For forming an electrode assembly, a positive electrode roll, a negative electrode roll and two separator rolls are usually used. A separator fed from one of the two separator rolls is interposed between the positive electrode and the negative electrode, and a separator fed from the other one of the two separator rolls is disposed outside the positive electrode or the negative electrode, namely, four layers in total are wound at the same time. In this step, the electrode including columnar particles slanting with respect to a direction normal to the current collector is wound such that the bottom of the columnar particles comes closer to the winding axis. As a result, the head of the columnar particles included in the electrode assembly is positioned at the outer round side of the electrode assembly than the bottom.

As described above, the winding direction is reversed, in principle, after each step is finished, the step including steps of: fabricating a negative electrode; vapor-depositing lithium; cutting the electrode; winding a positive electrode, a negative electrode and a separator; and the like. As for the battery of the invention, it will suffice if the electrode assembly is wound such that the head of the columnar particles is finally positioned at the outer round side Do of the electrode assembly than the bottom in the finished battery. If the electrode assembly fabricated through the production process as described above has such a winding direction, an extra step of winding again is not needed. However, in the case where the head of the columnar particles is not positioned at the outer round side Do of the electrode assembly than the bottom by the foregoing production process only, a step of winding again must be inserted in the production process once or an odd number of times. By doing this, the winding direction of the electrode assembly can be adjusted as appropriate.

It is preferable that a positive electrode lead and a negative electrode lead are connected with the positive electrode and the negative electrode, respectively, before an electrode assembly is formed. The resultant electrode assembly is inserted into a predetermined battery case (for example, a square or cylindrical battery can), and then the positive electrode lead and the negative electrode lead are connected with predetermined terminals (a battery can, a sealing plate, etc.). Thereafter, a non-aqueous electrolyte is injected into the battery case. Then the interior is evacuated to vacuum, thereby to allow the electrode assembly to be impregnated with the non-aqueous electrolyte. Finally, the battery case is sealed with a sealing plate, etc., whereby a battery is finished.

The battery of the invention includes a lithium secondary battery of various shapes, such as cylindrical, flat, and rectangular shapes. The battery shape and sealing type is not particularly limited. An example of the structure of a cylindrical lithium secondary battery will be hereinafter described.

Figure 15:
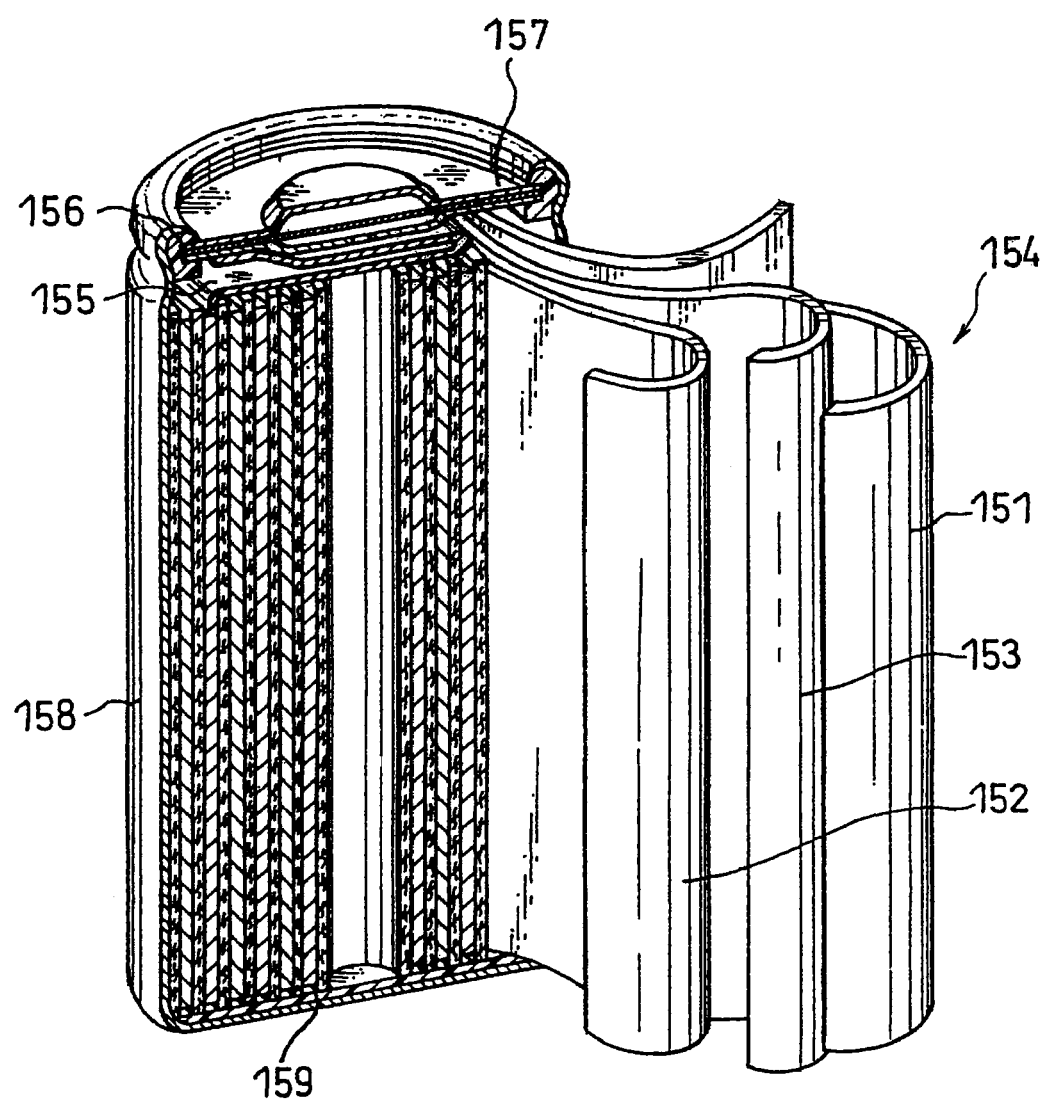
[FIG. 15] A cross-sectional perspective view, partially developed, of an example of a cylindrical battery.

FIG. 15 is a longitudinal cross-sectional view of a cylindrical lithium secondary battery according to the invention. A band-shaped positive electrode 151 and a band-shaped negative electrode 152 are wound with a band-shaped separator 153 interposed therebetween, of which width is larger than the both electrodes, thereby to form an electrode assembly 154. To the positive electrode 151, a positive electrode lead 155 made of aluminum etc. is connected, and one end of the positive electrode lead is connected to a sealing plate 157 with an insulating packing 156 made of polypropylene etc. provided on the periphery thereof. To the negative electrode 152, a negative electrode lead (not shown) made of cupper etc. is connected, and one end of the negative electrode lead is connected to a battery can 158 housing the electrode assembly 154. On the top and bottom of the electrode assembly 154, an upper insulating ring (not shown) and a lower insulating ring 159 are disposed, respectively. The electrode assembly 154 is impregnated with an electrolyte (not shown) having lithium ion conductivity. The opening of the battery can 158 is closed with the sealing plate 157.

At least one of the positive electrode 151 and the negative electrode 152 (for example, the negative electrode 152) includes a current collector and an active material layer carried on at least one face of the current collector. The active material layer includes columnar particles having a bottom and a head, the bottom of the columnar particles is adhered to the current collector, and the head of the columnar particles is positioned at the outer round side of the electrode assembly 154 than the bottom. In other words, the growth direction of the columnar particles goes from the inner round side toward the outer round side of the electrode assembly 154. An angle formed between a direction from the bottom toward the head of the columnar particles and a direction normal to the current collector is, for example, 20° or more to 70° or less.

Preferably, a first active material layer is carried on one face of the current collector, and a second active material layer is carried on the other face; and each of the active material layers has the structure as described above. In this case, an angle formed between a component parallel to the current collector of a growth direction of the columnar particles included in the first active material layer, and a component parallel to the current collector of a growth direction of the columnar particles included in the second active material layer is, for example, 80° or more and 90° or less.

For the electrolyte, for example, various solid electrolytes or liquid non-aqueous electrolytes having lithium ion conductivity may be used. Although the liquid non-aqueous electrolyte is not particular limited, the one prepared by dissolving a lithium salt in a non-aqueous solvent is preferably used. It is desirable that the concentration of lithium salt in the liquid non-aqueous electrolyte is 0.5 mol/L or more and 2 mol/L or less.

For the non-aqueous solvent, for example, cyclic carbonates such as ethylene carbonate and propylene carbonate; chain carbonates such as dimethyl carbonate, diethyl carbonate and ethyl methyl carbonate are preferably used. Generally, a mixture solvent of cyclic carbonates and chain carbonates is used. To the non-aqueous solvent, γ-butyrolactone, dimethoxyethane, and the like may be added. However, no particular limitation is imposed on the composition of the liquid non-aqueous electrolyte.

For the lithium salt, for example, lithium hexafluorophosphate, lithium tetrafluoroborate, an imide-lithium salt, and the like may be used. Among these, a liquid non-aqueous electrolyte mainly containing lithium hexafluorophosphate makes the battery characteristics favorable as compared with liquid non-aqueous electrolytes mainly containing other lithium salts. It is preferable that small amounts of lithium tetrafluoroborate and an imide-lithium salt are used in combination with lithium hexafluorophosphate.

No particular limitation is imposed on the separator and an outer case, and materials used for various types of batteries may be used as desired. For the separator, for example, a microporous film made of a polyolefin, and the like may be used.

The invention will be hereinafter described in detail with reference to Examples. It should be noted that the invention is not limited to the following Examples.

EXAMPLE 1

(i) Fabrication of Negative Electrode

For the negative electrode current collector, a 35 μm thick copper foil available from Furukawa Circuit Foil Co., Ltd. having a roughened surface (Ra=1.8 μm) was used. The surface roughness Ra is specified in Japanese Industrial Standards (JIS B 0601-1994). For the active material source, a massive silicon simple substance with high purity (5N) was used.

The production apparatus as shown in FIG. 12 was used to continuously form a negative electrode active material layer on a negative electrode current collector of continuous length in the following procedures. The vacuum chamber 121 in the production apparatus 120 was evacuated to vacuum. Thereafter, oxygen was introduced to the interior of the vacuum chamber 121. A mass flow controller was used to introduce oxygen to the interior of the vacuum chamber 121 therethrough. The flow rate of oxygen was adjusted so that the degree of vacuum during the formation of an active material layer became approximately 0.03 Pa.

In the oxygen atmosphere as described above, silicon simple substance serving as the active material source was evaporated. First, an electron beam with an accelerating voltage of −10 kV was irradiated to the massive silicon simple substance using a 270-degree deflection type electron beam source available from JEOL Ltd, to dissolve silicon. Then the emission current of the electron beam was gradually increased to produce a vapor of silicon.

The position of the opening of the shielding plate 128 was adjusted so that an incident direction of the vapor of silicon and a direction normal to the current collector formed an angle of 50 to 70°. The vapor of silicon passed through the opening, together with oxygen, was incident on the surface of the negative electrode current collector which was moving obliquely from the transfer roller 125b until it reached the periphery of the can roller 126. Thereafter, the current collector carrying an active material layer was wound on the winding roller 127. The thickness of the active material layer was controlled to be 15 μm.

The composition of the active material analyzed with XRF (X-ray fluorescence spectroscopy) was $SiO_{0.3}$.

Observation of the active material layer indicated that the active material layer included columnar particles slanting with respect to a direction normal to the current collector. The active material layer was cut in a direction parallel to the direction normal to the current collector and parallel to the growth direction of the columnar particles, and a cross section (cross section C) of the active material layer was observed with an electron microscope. The result indicated that the angle β formed between the direction from the bottom toward the head of the columnar particles and the direction normal to the current collector was approximately 40°.

The negative electrode current collector carrying the active material layer was cut in a band shape (width: 15 mm, length: 340 mm) having dimensions suitable for fabricating an electrode assembly, which was used as a negative electrode. In this step, the negative electrode was cut out so that the component parallel to the current collector of the direction from the bottom toward the head of the columnar particles was in parallel with the longitudinal direction of the negative electrode. Around one end portion of the negative electrode in its longitudinal direction (an end portion located at the bottom side of the columnar particles, not at the head side), a negative electrode lead was welded on the back face of the negative electrode current collector, the face not carrying the active material layer.

(ii) Fabrication of Positive Electrode 100 parts by weight of lithium cobaltate ($LiCoO_2$) having a mean particle size of approximately 10 μm serving as a positive electrode active material, 3 parts by weight of acetylene black serving as a conductive agent, 8 parts by weight of a polyvinylidene fluoride powder serving as a binder, and an appropriate amount of N-methyl-2-pyrrolidone (NMP) was sufficiently mixed, to prepare a positive electrode material mixture paste.

The resultant paste was applied onto one face of a positive electrode current collector made of a 20 μm thick aluminum foil, dried, and then rolled to form a positive electrode active material layer. The thickness of the positive electrode active material layer was approximately 75 μm. Thereafter, the positive electrode current collector carrying the active material layer was cut in a band shape (width: approximately 13 mm, length: approximately 330 mm) having dimensions suitable for fabricating an electrode assembly, which was used as a positive electrode. Around one end portion of the positive electrode in its longitudinal direction, a positive electrode lead was welded on the back face of the positive electrode current collector, the face not carrying the active material layer.

(iii) Fabrication of Electrode Assembly

The positive electrode and the negative electrode were wound with the positive electrode active material layer and the negative electrode active material layer opposed to each other and a separator interposed between these electrodes, whereby a cylindrical electrode assembly was formed. In this step, in order to position the head of the columnar particles in the negative electrode active material layer at the outer round side of the electrode assembly than the bottom, in the negative electrode, the end portion having the negative electrode lead was used as the winding axis side. In the positive electrode, the end portion not having the positive electrode lead was used as the winding axis side. Here, for the separator, a 20 μm thick microporous film made of polyethylene was used. The relation between the electrode assembly and the slanting direction of the columnar particles in the negative electrode active material layer is shown in the column of Example 1 in FIG. 16.

(iv) Fabrication of Battery

The resultant electrode assembly was inserted into a case made of a laminated sheet including an aluminum foil, and then a liquid non-aqueous electrolyte was injected into the case. For the liquid non-aqueous electrolyte, the one prepared by dissolving $LiPF_6$ at a concentration of 1 mol/L in a solvent mixture of ethylene carbonate and diethyl carbonate in a volume ratio of 1:1 was used. The case was evacuated to vacuum, to allow the electrode assembly to be impregnated with the liquid non-aqueous electrolyte, and then the case was sealed.

EXAMPLE 2

Figure 16:
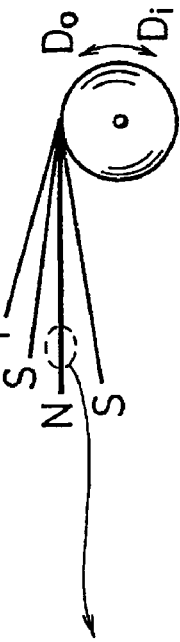
[FIG. 16] Sets of diagrams showing relations between an electrode assembly and a slanted direction of columnar particles in a negative electrode active material layer in Examples and Comparative Examples.

A battery was fabricated in the same manner as in Example 1 except that the electrode assembly was wound in such a state as shown in the column of Example 2 in FIG. 16.

COMPARATIVE EXAMPLE 1

A battery was fabricated in the same manner as in Example 1 except that the electrode assembly was wound in such a state as shown in the column of Comparative Example 1 in FIG. 16.

COMPARATIVE EXAMPLE 2

A battery was fabricated in the same manner as in Example 1 except that the electrode assembly was wound in such a state as shown in the column of Comparative Example 2 in FIG. 16.

[Evaluation]

(Charge-Discharge Test)

The batteries fabricated in Examples 1 and 2 and Comparative Examples 1 and 2 were subjected eight cycles of charge-discharge with a charge-discharge rate of 0.1 C (a current value required for charging or discharging electricity in an amount equivalent to the nominal capacity in 10 hours). Thereafter, 100 cycles of charge-discharge were performed with a charge-discharge rate of 1 C (a current value required for charging or discharging electricity in an amount equivalent to the nominal capacity in one hour). Here, the charge-end voltage was 4.05 V, and the discharge-end voltage was 2.0 V.

Figure 17A:
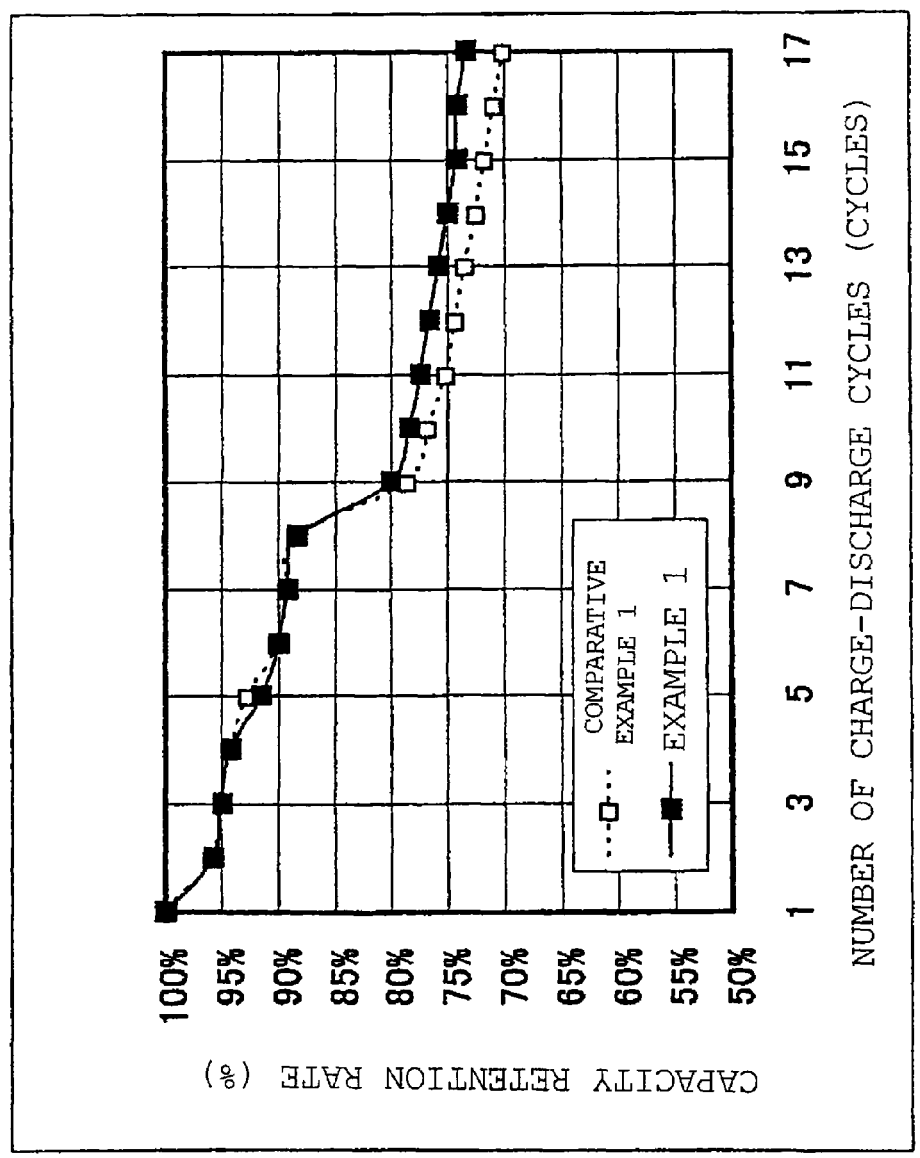
[FIG. 17A] A graph showing relations between the discharge capacity and the number of charge/discharge cycles of batteries in Example 1 and Comparative Example 1.

With respect to batteries of Example 1 and Comparative Example 1, relations between the discharge capacity and the number of charge-discharge cycles when the discharge capacity at the first cycle is assumed to be 100% are shown in FIG. 17A. Further with respect to batteries of Example 2 and Comparative Example 2, relations between the discharge capacity and the number of charge-discharge cycles when the discharge capacity at the first cycle is assumed to be 100% are shown in FIG. 17B.

Figure 17B:
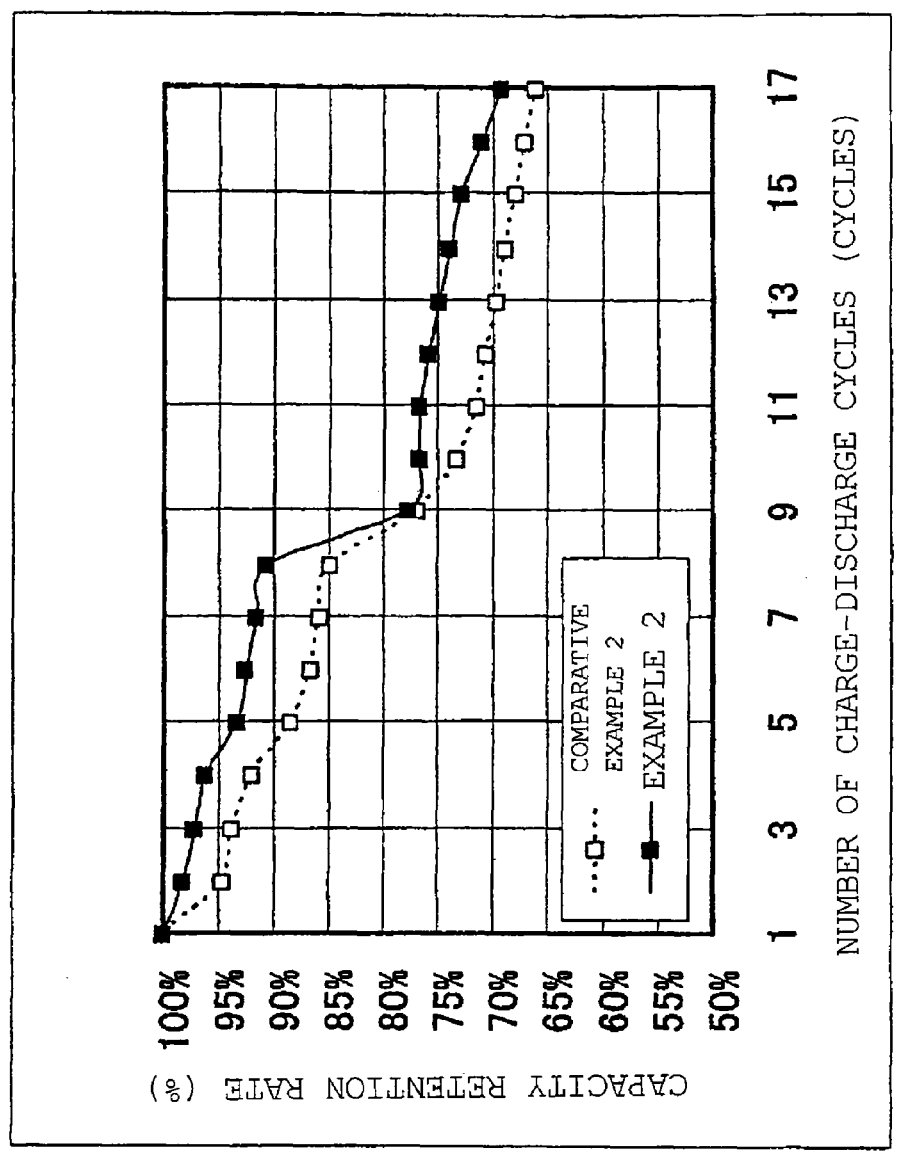
[FIG. 17B] A graph showing relations between the discharge capacity and the number of charge/discharge cycles of batteries in Example 2 and Comparative Example 2.

As shown in FIG. 17A and FIG. 17B, it was confirmed that the batteries of Examples 1 and 2 have higher capacity retention rates, compared with the batteries of Comparative Examples 1 and 2.

(Shape of Battery)

With respect to the batteries of Examples 1 and 2 and Comparative Examples 1 and 2, the degree of deformation of the battery resulted from the foregoing charge-discharge test was measured with X-ray CT scanning to compared the results. The measurement was carried out before the charge-discharge was started and after the charge-discharge was performed 100 cycles. The ratio of the major axis (maximum diameter) to the minor axis (minimum diameter) of the transverse cross-section of the electrode assembly was determined. The results are shown in Table 1.

TABLE 1

| | Major axis/Minor axis (Before charge-discharge⇒ after 100 cycles) |
|---|---|
| Example 1 | 1.00⇒ 1.00 |
| Comparative Example 1 | 1.00⇒ 1.03 |
| Example 2 | 1.02⇒ 1.02 |
| Comparative Example 2 | 1.02⇒ 1.07 |

As shown in Table 1, as for the electrode assemblies in Examples 1 and 2, the degree of deformation of the electrode assemblies was small. It is considered therefore that the troubles due to deformation of the battery or the electrode assembly can be prevented. For example, it is considered that troubles such as a reduction in capacity due to a partial deformation of the electrode assembly can be prevented.

In the foregoing Examples, although the description was made about the case where the active material layer was formed on one face of the current collector, also in the case where the active material layer is formed on both faces of the current collector, a battery capable of minimizing the deformation of the electrode assembly and excellent in charge-discharge cycle characteristics can be obtained.

EXAMPLE 3

A negative electrode active material layer was formed on both faces of the negative electrode current collector in a manner in conformance with Example 1. The resultant current collector with the active material layers was used to fabricate a cylindrical battery as shown in FIG. 15.

(i) Fabrication of Negative Electrode

After a negative electrode active material layer was formed on one face of the negative electrode current collector in the same manner as in Example 1, the electrode roll was detached from the winding roller 127. The detached electrode roll was reversed and placed on the feeding roller 123, so that a negative electrode active material layer could be continuously formed also on the back face of the negative electrode current collector.

Here, the production conditions such as the amount of oxygen were changed so that the thickness of the negative electrode active material layer became 17 μm per one face and the composition of the active material determined by XRF analysis became $SiO_{0.4}$.

Observation of the active material layer indicated that the active material layer included columnar particles slanting with respect to a direction normal to the current collector. The angle β formed between the direction from the bottom toward the head of the columnar particles and the direction normal to the current collector was approximately 40° on both faces. The angle α formed between a component parallel to the current collector of the direction from the bottom toward the head of the columnar particles in one of the active material layers and a component parallel to the current collector of the direction from the bottom toward the head of columnar particles in the other one of the active material layers was 0°.

The negative electrode current collector carrying the active material layer was cut in a band shape (width: 60 mm, length: 700 mm) having dimensions suitable for fabricating an electrode assembly, which was used as a negative electrode. In this step, the negative electrode was cut out so that the component parallel to the current collector of the direction from the bottom toward the head of the columnar particles became in parallel with the longitudinal direction of the negative electrode. Around one end portion of the negative electrode in the longitudinal direction (an end portion located at the bottom side of the columnar particles, not at the head side), part of the active material layer was scraped off, and a negative electrode lead was welded to the negative electrode current collector.

(ii) Fabrication of Positive Electrode

The same positive electrode material mixture paste as used in Example 1 was applied onto both faces of a positive electrode current collector made of a 20 μm thick aluminum foil, dried, and then rolled to form a positive electrode active material layer. The thickness of the positive electrode active material layer was approximately 60 μm. Thereafter, the positive electrode current collector carrying the active material layers was cut in a band shape (width: approximately 58 mm, length: approximately 690 mm) having dimensions suitable for fabricating an electrode assembly, which was used as a positive electrode. Around one end portion of the positive electrode in the longitudinal direction, part of the active material layer was scraped off, and a positive electrode lead was welded to the positive electrode current collector.

(iii) Fabrication of Electrode Assembly

The positive electrode and the negative electrode were wound in the same manner as in Example 1, to form a cylindrical electrode assembly. In this step, in order to position the head of the columnar particles in the negative electrode active material layer at the outer round side of the electrode assembly than the bottom, in the negative electrode, the end portion having the negative electrode lead was used as the winding axis side. In the positive electrode, the end portion not having the positive electrode lead was used as the winding axis side. For the separator, a 20 μm thick microporous film made of polyethylene was used.

(iv) Fabrication of Battery

The resultant electrode assembly was inserted into a cylindrical battery can. One end of the positive electrode lead was connected to a sealing plate with a polypropylene packing provided on the periphery thereof, and one end of the negative electrode lead was connected to the battery can. On the top and bottom of the battery assembly, an upper insulating ring and a lower insulating ring were disposed, respectively. Thereafter, the same liquid non-aqueous electrolyte as used in Example 1 was injected into the battery can. The battery can was evacuated to vacuum to allow the electrode assembly to be impregnated with the liquid non-aqueous electrolyte, and then the battery can was sealed.

The charge-discharge test of the battery thus fabricated was performed in the same manner as in Example 1. The proportion (capacity retention rate) of a discharge capacity after 100 cycles of charge-discharge to a discharge capacity at the first cycle was 90%. The shape of the battery after the charge-discharge test was checked with X-ray CT scanning. As a result, no great change was observed in the state of the electrode assembly.

In the foregoing Examples, although the description was made about the case of cylindrical batteries, also in the case of square batteries, a battery capable of minimizing the deformation of the electrode assembly and excellent in charge-discharge cycle characteristics can be obtained on the basis of the same principle as in the case of cylindrical batteries.

The invention is effective also in the case where the columnar particles have a complicated shape (for example, a zigzag shape or a helical shape).

Figure 18:
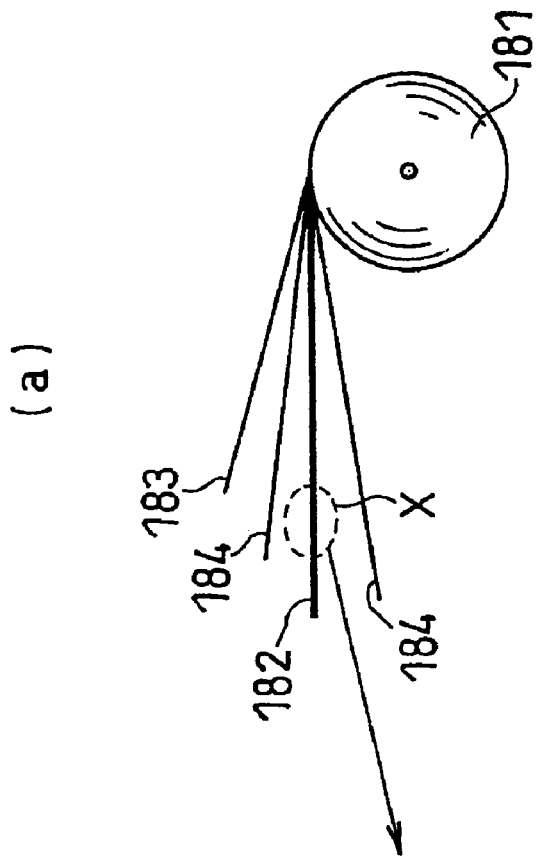
[FIG. 18] A set of diagrams showing an embodiment of the invention in the case where columnar particles have a zigzag shape.
Figure 18:
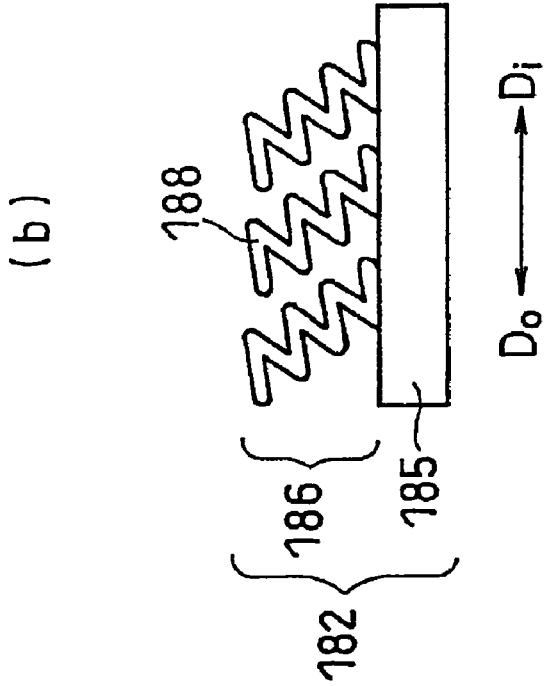

FIG. 18 is a set of diagrams showing an embodiment of the invention in the case where columnar particles have a zigzag shape. FIG. 18(a) is a partially developed diagram viewed from the bottom of one side of a cylindrical electrode assembly 181. The electrode assembly 181 includes a band-shaped first electrode 182, a band-shaped second electrode 183, and a band-shaped separator 184 disposed between these electrodes. FIG. 18(*b*) is a magnified schematic diagram of an area encircled by the dashed line X in FIG. 18(*a*), showing a cross-section of the first electrode 182. The first electrode 182 has a current collector 185 and an active material layer 186 carried on one face of the current collector. The active material layer 186 includes columnar particles 188, in which the head of the columnar particles 188 is positioned at an outer round side (Do) of the electrode assembly 181 than the bottom. The foregoing electrode 182 can be used to fabricate an electrode assembly, with the same effect as that of the invention. It should be noted that in FIG. 18, although only the diagrams in which the columnar particles are formed on one face of the current collector are shown, the columnar particles may be formed on both faces.

Figure 19:
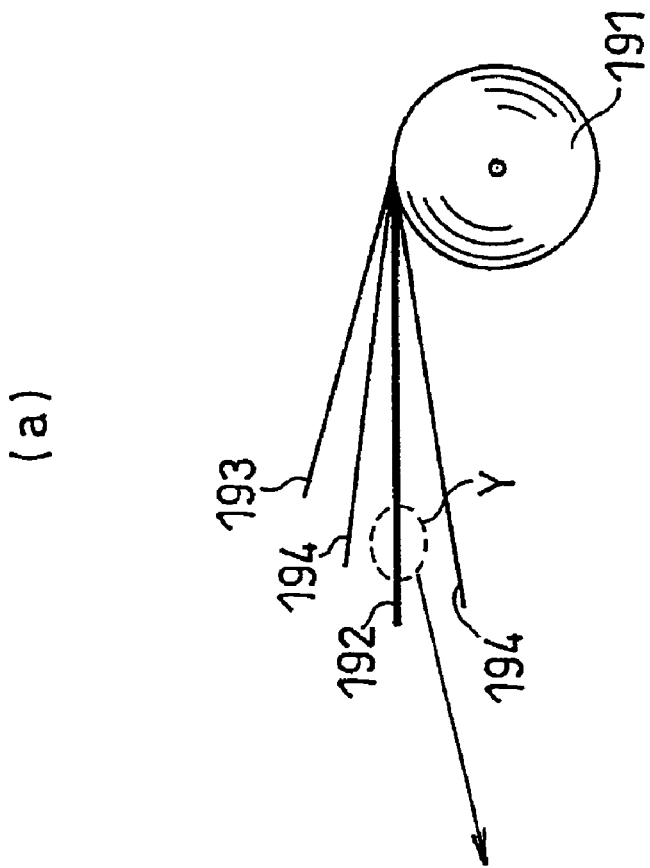
[FIG. 19] A set of diagrams showing an embodiment of the invention in the case where columnar particles have a helical shape.
Figure 19:
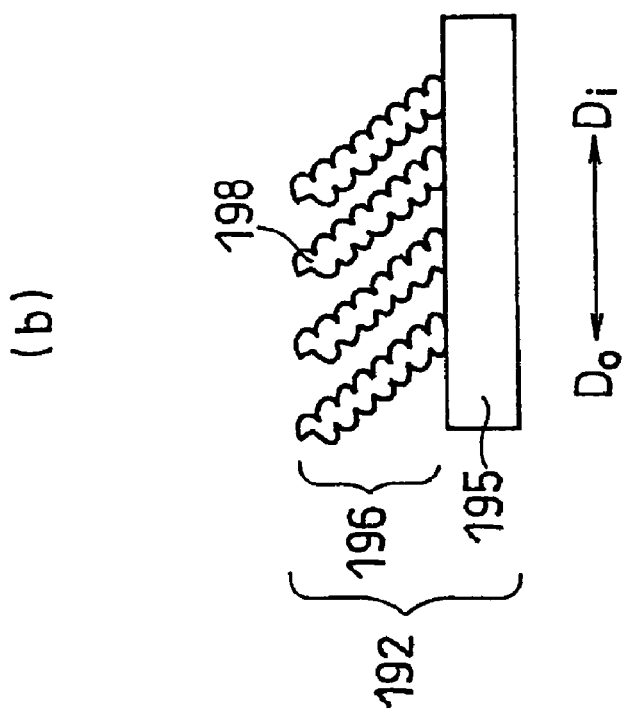

FIG. 19 is a set of diagrams showing an embodiment of the invention in the case where columnar particles have a helical shape. FIG. 19(*a*) is a partially developed diagram viewed from the bottom of one side of a cylindrical electrode assembly 191. The electrode assembly 191 includes a band-shaped first electrode 192, a band-shaped second electrode 193, and a band-shaped separator 194 disposed between these electrodes. FIG. 19(*b*) is a magnified schematic diagram of an area encircled by the dashed line Y in FIG. 19(*a*), showing a cross-section of the first electrode 192. The first electrode has a current collector 195 and an active material layer carried on one face of the current collector. The active material layer 196 includes columnar particles 198, in which the head of the columnar particles 198 is positioned at an outer round side (Do) of the electrode assembly 191 than the bottom. The foregoing electrode 192 can be used to fabricate an electrode assembly, with the same effect as that of the invention. It should be noted that in FIG. 19, although only the diagrams in which the columnar particles are formed on one face of the current collector are shown, the columnar particles may be formed on both faces.

Industrial Applicability

The invention is effective in a battery including a high capacity active material, particularly in a lithium secondary battery. According to the invention, during the expansion of the active material, the pressure to be applied to the separator and the electrode can be reduced. This makes it easy to maintain the shapes of the active material particles and secure the micropores of the separator. The battery of the invention is applicable, for example, to the power sources for personal digital assistants, mobile electronic equipment, compact home electrical energy storage apparatus, motorcycles, electric cars and hybrid electric cars, and the like. However, there is no particular limitation on the application.

The invention claimed is:

1. A lithium secondary battery comprising a first electrode, a second electrode, a separator disposed between said first electrode and said second electrode, and an electrolyte having lithium ion conductivity, said first electrode and said second electrode being wound with said separator disposed therebetween to form an electrode assembly, wherein:

said first electrode includes a current collector and an active material layer carried on one face of said current collector, said active material layer includes columnar particles projecting from said one face of said current collector and having a bottom and a head, said plurality of columnar particles being slanted with respect to a direction N normal to said one face of the current collector with the head being tilted toward a position at which the winding is completed, and said plurality of columnar particles bend such that a convex side of the plurality of bent columnar particles faces the current collector wherein an angle formed between a direction from the bottom toward the head of said plurality of columnar particles and the direction N is 20° to 70°.

2. The lithium secondary battery in accordance with claim 1, wherein said first electrode is a negative electrode.

3. The lithium secondary battery in accordance with claim 1, wherein an angle formed between a component parallel to said current collector of the direction from the bottom toward the head of said columnar particles, and a winding axis of said electrode assembly is 80° or more and 100° or less.

4. The lithium secondary battery in accordance with claim 1, wherein said columnar particles include at least one selected from the group consisting of a silicon simple substance, a silicon alloy, a compound containing silicon and oxygen, a compound containing silicon and nitrogen, a tin simple substance, a tin alloy, a compound containing tin and oxygen, and a compound containing tin and nitrogen.

5. A lithium secondary battery comprising a first electrode, a second electrode, a separator disposed between said first electrode and said second electrode, and an electrolyte having lithium ion conductivity, said first electrode and said second electrode being wound with said separator disposed therebetween to form an electrode assembly, wherein:

said first electrode includes a current collector and an active material layer carried on one face of said current collector, said first active material layer includes a plurality of columnar particles A projecting from said one face of said current collector and having a bottom and a head, said columnar particles A being slanted with respect to a direction N1 normal to said one face of the current collector with the head being tilted toward a position at which the winding is completed, said second active material layer includes columnar particles B projecting from said the other face of said current collector and having a bottom and a head, the bottom of said columnar particles B being slanted with respect to a direction N2 normal to the other face of the current collector with the head being tilted toward a position at which the winding is completed, and said plurality of columnar particles A bend such that a convex side of the plurality of bent columnar particles A faces the current collector, and said columnar particles B bend such that a convex side of the plurality of bent columnar particles B faces the current collector wherein an angle formed between the direction from the bottom toward the head of said plurality of columnar particles A and the direction N1 is 20° to 70° ; and an angle formed between the direction from the bottom toward the head of said columnar particles B and the direction N2 is 20° to 70°.

6. The lithium secondary battery in accordance with claim 5, wherein said first electrode is a negative electrode.

7. The lithium secondary battery in accordance with claim 5, wherein an angle formed between a component parallel to said current collector of a direction from the bottom toward the head of said plurality of columnar particles A, and a component parallel to said current collector of a direction from the bottom toward the head of said columnar particles B is 0° or more and 90° or less.

8. The lithium secondary battery in accordance with claim 5, wherein an angle formed between the component parallel to said current collector of the direction from the bottom toward the head of said plurality of columnar particles A, and a winding axis of said electrode assembly is 80° or more and 100° or less; and an angle formed between the component parallel to said current collector of the direction from the bottom toward the head of said columnar particles B, and the winding axis of said electrode assembly is 80° or more and 100° or less.

9. The lithium secondary battery in accordance with claim 5, wherein said columnar particles A and said columnar particles B each include at least one selected from the group consisting of a silicon simple substance, a silicon alloy, a compound containing silicon and oxygen, a compound containing silicon and nitrogen, a tin simple substance, a tin alloy, a compound containing tin and oxygen, and a compound containing tin and nitrogen.

* * * * *